(12) United States Patent
Altonen et al.

(10) Patent No.: US 11,010,816 B2
(45) Date of Patent: May 18, 2021

(54) METHODS OF SELECTING THERMOPLASTIC MATERIALS FOR USE WITH PLASTIC ARTICLE FORMING APPARATUSES THAT CONTROL MELT FLOW

(71) Applicant: IMFLUX INC, Hamilton, OH (US)

(72) Inventors: Gene Michael Altonen, Hamilton, OH (US); Nathan Daniel Estruth, Cincinnati, OH (US); Dennis James Pratel, Union Township, OH (US)

(73) Assignee: IMFLUX INC, Hamilton, OH (US)

( * ) Notice: Subject to any disclaimer, the term of this patent is extended or adjusted under 35 U.S.C. 154(b) by 145 days.

(21) Appl. No.: 15/247,687

(22) Filed: Aug. 25, 2016

(65) Prior Publication Data

US 2017/0057146 A1    Mar. 2, 2017

Related U.S. Application Data

(60) Provisional application No. 62/210,509, filed on Aug. 27, 2015.

(51) Int. Cl.
*B29C 45/77* (2006.01)
*G06Q 30/06* (2012.01)
*B29K 105/00* (2006.01)

(52) U.S. Cl.
CPC ......... *G06Q 30/0633* (2013.01); *B29C 45/77* (2013.01); *B29C 2945/76006* (2013.01);
(Continued)

(58) Field of Classification Search
None
See application file for complete search history.

(56) References Cited

U.S. PATENT DOCUMENTS

| | | | | |
|---|---|---|---|---|
| 3,642,402 A | * | 2/1972 | Hutchinson | B29C 45/76 425/144 |
| 4,066,725 A | * | 1/1978 | Boettner | B29C 45/76 264/40.1 |

(Continued)

OTHER PUBLICATIONS

How P&G buys plastics. Plastics Today, Injection Molding, Materials, Business, Blow Molding. Nov. 30, 2004. Retrieved May 18, 2018.*

*Primary Examiner* — David P Turocy
(74) *Attorney, Agent, or Firm* — Marshall, Gerstein & Borun LLP

(57) ABSTRACT

A method of selecting thermoplastic materials for use with an injection molding apparatus that adjusts viscosity of a thermoplastic material based on an interpreted viscosity is provided. The method includes determining a target MFI for an identified plastic article based on performance properties. A thermoplastic material supply chain is analyzed and a first thermoplastic material having a first starting MFI and a first MFI range is identified and a second thermoplastic material having a second starting MFI and a second MFI range that is greater than the first MFI range is identified and is priced less than the first thermoplastic material. The second thermoplastic material is purchased. The second thermoplastic material is tested by providing the second thermoplastic material to the injection molding apparatus for multiple shot molding cycles with the second thermoplastic material in a molten state. The step of testing includes monitoring melt pressure of the molten second thermoplastic material using a sensor and providing a signal to a controller indicative of melt pressure. The controller controls introduction of an additive to the second thermoplastic material thereby changing a viscosity of the molten second thermoplastic material based on the signal. A molded article is formed by reducing (Continued)

a mold temperature of the second thermoplastic material within the at least one mold cavity.

10 Claims, 9 Drawing Sheets

(52) U.S. Cl.
CPC ............... *B29C 2945/76494* (2013.01); *B29C 2945/76531* (2013.01); *B29C 2945/76538* (2013.01); *B29K 2105/0067* (2013.01)

(56) References Cited

U.S. PATENT DOCUMENTS

| | | | | |
|---|---|---|---|---|
| 4,311,446 | A * | 1/1982 | Hold | B29C 45/76 425/144 |
| 2003/0146531 | A1* | 8/2003 | Tomura | B29C 45/1816 264/40.7 |
| 2012/0156443 | A1* | 6/2012 | Reeder | B29C 45/0053 428/195.1 |
| 2012/0295050 | A1* | 11/2012 | Altonen | B29C 45/77 428/36.92 |
| 2013/0069280 | A1* | 3/2013 | Altonen | B29C 45/77 264/328.1 |
| 2013/0137834 | A1* | 5/2013 | Dagley | C08J 5/18 525/333.7 |
| 2015/0035188 | A1* | 2/2015 | Altonen | B29C 45/77 264/40.7 |
| 2017/0057145 | A1* | 3/2017 | Altonen | B29C 45/7646 |

* cited by examiner

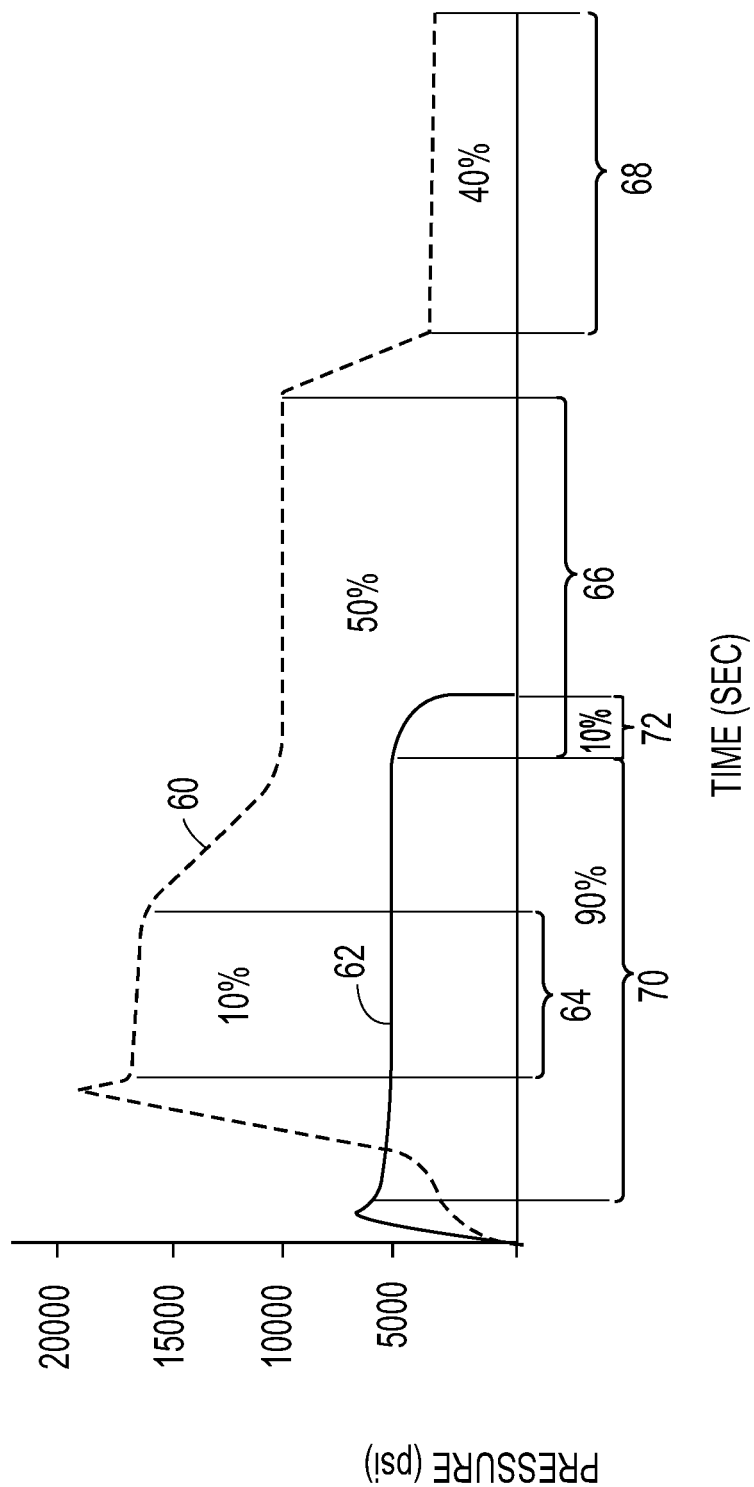

METHODS OF SELECTING THERMOPLASTIC MATERIALS FOR USE WITH PLASTIC ARTICLE FORMING APPARATUSES THAT CONTROL MELT FLOW

CROSS-REFERENCE TO RELATED APPLICATIONS

This application is a non-provisional application claiming the benefit of the filing date of U.S. Provisional Appl. No. 62/210,509, filed Aug. 27, 2015. U.S. Provisional Appl. No. 62/210,509 is hereby incorporated by reference.

TECHNICAL FIELD

The present disclosure relates to plastic article forming apparatuses and methods of producing plastic articles and, more particularly, to plastic article forming apparatuses and methods for controlling melt flow of the plastic resin used to form the plastic articles.

BACKGROUND

Melt-flow-rate (MFR) is used to establish the rate at which a polymer flows under specific conditions through an instrument with a specified geometry. The MFR test is covered by ASTM D 1238, while the international standard is ISO 1133. MFR is generally given in grams per 10 minutes. MFR is sometimes referred to as a unitless mass-flow-index (MFI), which will be referred to primarily herein. MFI is often used as an important characteristic in distinguishing one grade of material from another in a particular polymer family. MFI can be a relatively good gauge of the relative average molecular weight of a polymer, which some in the processing community believe is related to processability of the polymer. Generally, higher MFI polymers have lower molecular weights and lower MFI polymers have higher molecular weights.

End users of an injection molded product typically prefer higher molecular weight/lower MFI products as higher molecular weight polymers generally exhibit better product performance, such as impact resistance and stress-crack resistance. However, flow rate of a polymer is inversely related to viscosity and higher molecular weight polymers can be more difficult to flow through an injection molding apparatus and fill a mold during an injection molding process than lower molecular weight polymers. Lower molecular weight products, however, tend to have inferior product performance.

While MFI is generally accepted as an industry standard to qualify and compare polymers, the method to determine MFI has limitations in that it does not typically measure or quantify the viscosity of a material at the shear rates seen in typical injection molding processes. A poor relationship between MFI and behavior in multi-shear-rate flows can lead to tighter than necessary tolerances for MFI, which can limit the number of resins believed to be suitable for a particular process.

Accordingly, apparatuses and methods for actively controlling MFI during an injection molding process are desired to allow for use of plastic resins within a wider range of MFIs or that can experience wider changes in MFI values during processing.

SUMMARY

In one embodiment, a method of selecting thermoplastic materials for use with an injection molding apparatus that adjusts viscosity of a thermoplastic material based on an interpreted viscosity is provided. The method includes determining a target MFI for an identified plastic article based on performance properties. A thermoplastic material supply chain is analyzed and a first thermoplastic material having a first starting MFI and a first MFI range is identified and a second thermoplastic material having a second starting MFI and a second MFI range that is greater than the first MFI range is identified and is priced less than the first thermoplastic material. The second thermoplastic material is purchased. The second thermoplastic material is tested by providing the second thermoplastic material to the injection molding apparatus for multiple shot molding cycles with the second thermoplastic material in a molten state. The step of testing includes monitoring melt pressure of the molten second thermoplastic material using a sensor and providing a signal to a controller indicative of melt pressure. The controller controls introduction of an additive to the second thermoplastic material thereby changing a viscosity of the molten second thermoplastic material based on the signal. A molded article is formed by reducing a mold temperature of the second thermoplastic material within the at least one mold cavity.

In another embodiment, a method of selecting thermoplastic materials for use with an injection molding apparatus that adjusts viscosity of a thermoplastic material based on an interpreted viscosity is provided. The method includes determining a target MFI for an identified plastic article based on performance properties. A thermoplastic material supply chain is analyzed and a first thermoplastic material having a first starting MFI and a first MFI range is identified and a second thermoplastic material having a second starting MFI and a second MFI range is identified that is greater than the first MFI range and that is priced less than the first thermoplastic material. The second thermoplastic material is purchased. The second thermoplastic material is tested by providing the second thermoplastic material to the injection molding apparatus for multiple shot cycles with the second thermoplastic material in a molten state. The step of testing includes monitoring melt pressure of the molten second thermoplastic material in a mold cavity using a sensor and providing a signal indicative of melt pressure to a controller. The controller controls an injection element thereby changing melt pressure of the molten second thermoplastic material filling the mold cavity based on the signal to reach a target cavity pressure. A molded article is formed by reducing a mold temperature of the second thermoplastic material within the at least one mold cavity.

In another embodiment, a method of selecting thermoplastic materials for use with an injection molding apparatus that adjusts viscosity of a thermoplastic material based on an interpreted viscosity is provided. The method includes determining a target MFI for an identified plastic article based on performance properties. A thermoplastic material supply chain is analyzed and a first thermoplastic material having a first starting MFI and a first MFI range is identified and a second thermoplastic material having a second starting MFI and a second MFI range is identified that is greater than the first MFI range and being priced less than the first thermoplastic material. The second thermoplastic material is purchased. The second thermoplastic material is tested by providing the second thermoplastic material to the injection molding apparatus for multiple shot molding cycles with the second thermoplastic material in a molten state. The step of testing includes monitoring melt pressure of the molten second thermoplastic material using a sensor and providing a signal indicative of viscosity of the molten second thermoplastic material to a controller. The controller controls, based on the signal, (i) an injection element thereby changing melt pressure of the molten second thermoplastic material filling a mold cavity and (ii) introduction of an additive to the molten second thermoplastic material thereby changing a viscosity of the molten second thermoplastic material. A molded article is formed by reducing a mold temperature of the second thermoplastic material within the at least one mold cavity.

BRIEF DESCRIPTION OF THE DRAWINGS

The embodiments set forth in the drawings are illustrative in nature and not intended to limit the subject matter defined by the claims. The following detailed description of the illustrative embodiments can be understood when read in conjunction with the following drawings, where like structure is indicated with like reference numerals and in which:

FIG. 5 is another cavity pressure vs. time graph for the substantially constant low injection pressure molding machine of FIG. 1 superimposed over a cavity pressure vs. time graph for a conventional high variable pressure injection molding apparatus, the graphs illustrating the percentage of fill time devoted to certain fill stages;

DETAILED DESCRIPTION

Figure 1:
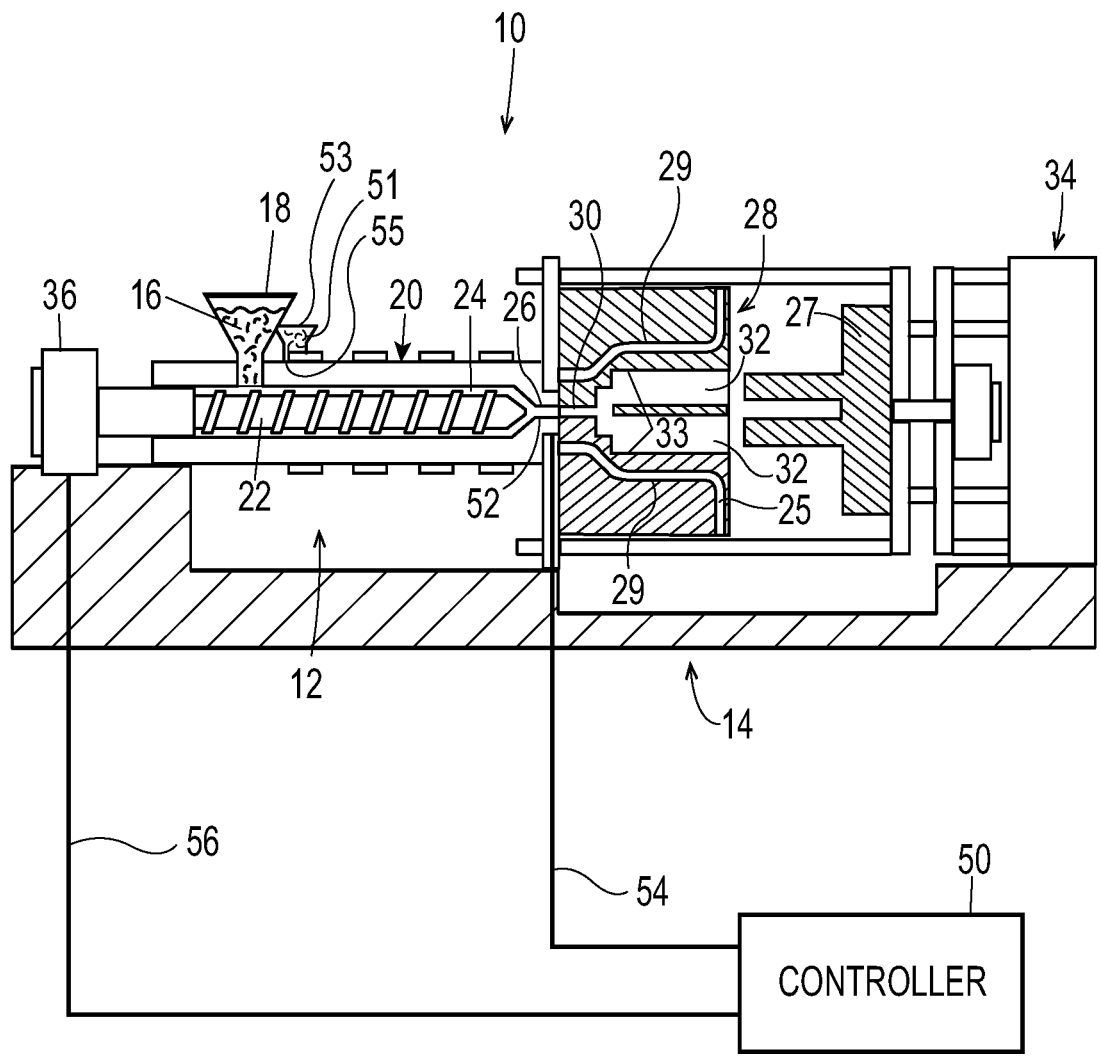
FIG. 1 illustrates a schematic view of one embodiment of a substantially constant low injection pressure molding machine constructed according to the disclosure.

The present disclosure relates to methods and apparatuses for manufacturing plastic articles, for example caps such as dosing caps, handles, packages, containers, bottles, vials, tubes, cans, toys, decorations, and the like, as well as preliminary products that may be subject to a subsequent forming process, while controlling the melt-flow-index of the polymer material during the injection molding process and/or allowing use of thermoplastic materials having a wider range of MFIs variability, than previously thought could be used in injection molding processes. The present disclosure may be used in conjunction with, for example, one step, one and a half step, and two step injection blow molding processes and apparatuses. A one step injection molding process may include injection molding an article using a single apparatus, for example, while a two step injection molding process may include a separate injection molding apparatus and a separate blow molding apparatus, as an example. A one and a half step injection molding process may include a stretching step to mechanically stretch a article during a molding process, for example. The article may therefore be formed into a final plastic article.

The present disclosure includes a first injection molding stage at an injection molding station or apparatus. A thermoplastic material is injected with an injection element into a first mold cavity or a plurality of mold cavities at a substantially constant low injection pressure to form a product. Typically, the thermoplastic material is introduced to the injection molding apparatus through a primary hopper. One or more additives may be introduced to the injection molding apparatus through a secondary hopper. For example, additives may be selected, among other things, to influence MFI of the thermoplastic material. Introduction of the additives may be controlled in real time by a controller that receives information indicative of a current viscosity of the injection material as it flows through the injection molding apparatus.

The apparatuses and methods disclosed herein include improved injection molding techniques comprising, in part, substantially constant and low injection pressure during the forming process. The apparatuses and methods disclosed herein may improve plastic article quality by creating a more consistent and more uniform process that allows for use of plastic resins having a wider range of MFI variability. In some embodiments, the MFI of a thermoplastic batch material may be adjusted in real time based on information received by the controller from the sensors at one or more locations within the injection molding apparatus.

The term "low pressure," as used herein with respect to melt pressure of a thermoplastic material, means melt pressures in a vicinity of a nozzle of an injection molding apparatus of about 10,000 pounds per square inch (psi) and lower, such as about 400 psi.

The term "substantially constant pressure," as used herein with respect to a melt pressure of a thermoplastic material, means that deviations from a baseline melt pressure do not produce meaningful changes in physical properties of the thermoplastic material. For example, "substantially constant pressure" includes, but is not limited to, pressure variations for which viscosity of the melted thermoplastic material do not meaningfully change. The term "substantially constant" in this respect includes deviations of approximately +/−30% from a baseline melt pressure. For example, the term "a substantially constant pressure of approximately 4,600 psi" includes pressure fluctuations within the range of about 6,000 psi (30% above 4,600 psi) to about 3,200 psi (30% below 4,600 psi). A melt pressure is considered substantially constant as long as the melt pressure fluctuates no more than +/−30% from the recited pressure.

The term "melt holder," as used herein, refers to the portion of an injection molding apparatus that contains molten plastic in fluid communication with the machine nozzle. The melt holder is heated, such that a polymer may be prepared and held at a desired temperature. The melt holder is connected to a power source, for example a hydraulic cylinder or electric servo motor, that is in communication with a central control unit or controller, and can be controlled to advance a diaphragm to force molten plastic through the machine nozzle. The molten material then flows through the runner system into the mold cavity. The melt holder may be cylindrical in cross section, or have alternative cross sections that will permit a diaphragm to force polymer under pressures that can range from as low as 100 psi to pressures of 40,000 psi or higher through the machine nozzle. The diaphragm may optionally be integrally connected to a reciprocating screw with flights designed to plasticize polymer material prior to injection.

The term "high L/T ratio" generally refers to L/T ratios of 100 or greater, and more specifically to L/T ratios of 200 or greater, but less than 1,000. Calculation of the L/T ratio is defined below.

The term "peak flow rate" generally refers to the maximum volumetric flow rate, as measured at the machine nozzle.

The term "peak injection rate" generally refers to the maximum linear speed the injection ram travels in the process of forcing polymer into the feed system. The ram can be a reciprocating screw such as in the case of a single stage injection system, or a hydraulic ram such as in the case of a two stage injection system.

The term "ram rate" generally refers to the linear speed at which the injection ram travels in the process of forcing polymer into the feed system.

The term "flow rate" generally refers to the volumetric flow rate of polymer as measured at the machine nozzle. This flow rate can be calculated based on the ram rate and ram cross sectional area, or measured with a suitable sensor located in the machine nozzle.

The term "cavity percent fill" generally refers to the percentage of the cavity that is filled on a volumetric basis. For example, if a cavity is 95% filled, then the total volume of the mold cavity that is filled is 95% of the total volumetric capacity of the mold cavity.

The term "melt temperature" generally refers to the temperature of the polymer that is maintained in the melt holder and in the material feed system when a hot runner system is used, which keeps the polymer in a molten state. The melt temperature varies by material; however, a desired melt temperature is generally understood to fall within the ranges recommended by the material manufacturer.

The term "gate size" generally refers to the cross sectional area of a gate, which is formed by the intersection of the runner and the mold cavity. For hot runner systems, the gate can be of an open design where there is no positive shut off of the flow of material at the gate, or a closed design where a valve pin is used to mechanically shut off the flow of material through the gate into the mold cavity (commonly referred to as a valve gate). The gate size refers to the cross sectional area, for example a 1 millimeter (mm) gate diameter refers to a cross sectional area of the gate that is equivalent to the cross sectional area of a gate having a 1 mm diameter at the point the gate meets the mold cavity. The cross section of the gate may be of any desired shape.

The term "effective gate area" generally refers to a cross sectional area of a gate corresponding to an intersection of the mold cavity and a material flow channel of a feed system (e.g., a runner) feeding thermoplastic material to the mold cavity. The gate could be heated or may not be heated. The gate could be round, or any cross sectional shape, suited to achieve the desired thermoplastic flow into the mold cavity.

The term "intensification ratio" generally refers to the mechanical advantage the injection power source has on the injection ram forcing the molten polymer through the machine nozzle. For hydraulic power sources, it is common that the hydraulic piston will have a 10:1 mechanical advantage over the injection ram. However, the mechanical advantage can range from ratios much lower, such as 2:1, to much higher mechanical advantage ratio such as 50:1.

The term "peak power" generally refers to the maximum power generated when filling a mold cavity. The peak power may occur at any point in the filling cycle. The peak power is determined by the product of the plastic pressure as measured at the machine nozzle multiplied by the flow rate as measured at the machine nozzle. Power is calculated by the formula $P=p*Q$ where p is pressure and Q is volumetric flow rate.

The term "volumetric flow rate" generally refers to the flow rate as measured at the machine nozzle. This flow rate can be calculated based on the ram rate and ram cross sectional area, or measured with a suitable sensor located in the machine nozzle.

The terms "filled" and "full," when used with respect to a mold cavity including thermoplastic material, are interchangeable and both terms mean that thermoplastic material has stopped flowing into the mold cavity.

The term "shot size" generally refers to the volume of polymer to be injected from the melt holder to completely fill the mold cavity or cavities. The shot size volume is determined based on the temperature and pressure of the polymer in the melt holder just prior to injection. In other words, the shot size is a total volume of molten plastic material that is injected in a stroke of an injection molding ram at a given temperature and pressure. Shot size may include injecting molten plastic material into one or more injection cavities through one or more gates. The shot of molten plastic material may also be prepared and injected by one or more melt holders.

The term "hesitation" generally refers to the point at which the velocity of the flow front is minimized sufficiently to allow a portion of the polymer to drop below its no flow temperature and begin to freeze off.

The term "electric motor" or "electric press," when used herein includes both electric servo motors and electric linear motors.

The term "Peak Power Flow Factor" refers to a normalized measure of peak power required by an injection molding system during a single injection molding cycle and the Peak Power Flow Factor may be used to directly compare power requirements of different injection molding systems.

The Peak Power Flow Factor is calculated by first determining the Peak Power, which corresponds to the maximum product of molding pressure multiplied by flow rate during the filling cycle (as defined herein), and then determining the shot size for the mold cavities to be filled. The Peak Power Flow Factor is then calculated by dividing the Peak Power by the shot size.

The term "substantially constant low injection pressure molding machine" is defined as a class 101 or a class 30 injection molding apparatus that uses a substantially constant injection pressure that is less than or equal to about 6,000 psi. Alternatively, the term "substantially constant low injection pressure molding machine" may be defined as an injection molding apparatus that uses a substantially constant injection pressure that is less than or equal to about 6,000 psi and that is capable of performing more than about 1 million cycles, alternatively more than about 1.25 million cycles, alternatively more than about 2 million cycles, alternatively more than about 5 million cycles, or alternatively more than 10 million cycles before the mold core (which is made up of first and second mold parts that define a mold cavity therebetween) reaches the end of its useful life. Characteristics of "substantially constant low injection pressure molding machines" may include, for example, mold cavities having an L/T ratio of greater than 100 (as an example, greater than 200), multiple mold cavities (as another example 4 mold cavities, as another example 16 mold cavities, as another example 32 mold cavities, as another example 64 mold cavities, as another example 128 mold cavities and as another example 256 mold cavities, or any number of mold cavities between 4 and 512, a heated or cold runner, and/or a guided ejection mechanism.

The term "useful life" is defined as the expected life of a mold part before failure or scheduled replacement. When used in conjunction with a mold part or a mold core (or any part of the mold that defines the mold cavity), the term "useful life" means the time a mold part or mold core is expected to be in service before quality problems develop in the molded part, before problems develop with the integrity of the mold part (e.g., galling, deformation of parting line, deformation or excessive wear of shut-off surfaces), or before mechanical failure (e.g., fatigue failure or fatigue cracks) occurs in the mold part. Typically, the mold part has reached the end of its "useful life" when the contact surfaces that define the mold cavity must be discarded or replaced. The mold parts may require repair or refurbishment from time to time over the "useful life" of a mold part and this repair or refurbishment does not require the complete replacement of the mold part to achieve acceptable molded part quality and molding efficiency. Furthermore, it is possible for damage to occur to a mold part that is unrelated to the normal operation of the mold part, such as a part not being properly removed from the mold and the mold being forcibly closed on the non-ejected part, or an operator using the wrong tool to remove a molded part and damaging a mold component. For this reason, spare mold parts are sometimes used to replace these damaged components prior to them reaching the end of their useful life. Replacing mold parts because of damage does not change the expected useful life.

The term "guided ejection mechanism" is defined as a dynamic part that actuates to physically eject a molded part from the mold cavity.

The term "coating" is defined as a layer of material less than 0.13 mm (0.005 inch) in thickness, that is disposed on a surface of a mold part defining the mold cavity, that has a primary function other than defining a shape of the mold cavity (e.g., a function of protecting the material defining the mold cavity, or a function of reducing friction between a molded part and a mold cavity wall to enhance removal of the molded part from the mold cavity).

The term "average thermal conductivity" is defined as the thermal conductivity of any materials that make up the mold cavity or the mold side or mold part. Materials that make up coatings, stack plates, support plates, and gates or runners, whether integral with the mold cavity or separate from the mold cavity, are not included in the average thermal conductivity. Average thermal conductivity is calculated on a volume weighted basis.

The term "effective cooling surface" is defined as a surface through which heat is removed from a mold part. One example of an effective cooling surface is a surface that defines a channel for cooling fluid from an active cooling system. Another example of an effective cooling surface is an outer surface of a mold part through which heat dissipates to the atmosphere. A mold part may have more than one effective cooling surface and thus may have a unique average thermal conductivity between the mold cavity surface and each effective cooling surface.

The term "nominal wall thickness" is defined as the theoretical thickness of a mold cavity if the mold cavity were made to have a uniform thickness. The nominal wall thickness may be approximated by the average wall thickness. The nominal wall thickness may be calculated by integrating length and width of the mold cavity that is filled by an individual gate.

The term "average hardness" is defined as the Rockwell hardness for any material or combination of materials in a desired volume. When more than one material is present, the average hardness is based on a volume weighted percentage of each material. Average hardness calculations include hardnesses for materials that make up any portion of the mold cavity. Average hardness calculations do not include materials that make up coatings, stack plates, gates or runners, whether integral with a mold cavity or not, and support plates. Generally, average hardness refers to the volume weighted hardness of material in the mold cooling region.

The term "mold cooling region" is defined as a volume of material that lies between the mold cavity surface and an effective cooling surface.

The term "cycle time" is defined as a single iteration of an injection molding process that is required to fully form an injection molded part. Cycle time includes the stages of advancing molten thermoplastic material into a mold cavity, substantially filling the mold cavity with thermoplastic material, cooling the thermoplastic material, separating first and second mold sides to expose the cooled thermoplastic material, removing the thermoplastic material, and closing the first and second mold sides.

Substantially constant low injection pressure molding machines may also be high productivity injection molding apparatus (e.g., a class 101 or a class 30 injection molding apparatus, or an "ultra high productivity molding machine"), such as the high productivity injection molding apparatus disclosed in U.S. patent application Ser. No. 13/601,514, filed Aug. 31, 2012, which is hereby incorporated by reference herein, that may be used to produce thin-walled consumer products, such as toothbrush handles and razor handles. Thin walled parts are generally defined as having a high L/T ratio of 100 or more.

The MFI of a thermoplastic material can be determined using one or both of ASTM D 1238 Standard Test Method for Melt Flow Rates of Thermoplastics by Extrusion Plastometer and ISO 1133 Determination of the Melt Mass-Flow Rate (MFR) and the Melt Volume-Flow Rate (MVR) of Thermoplastics. A "starting MFI" of a thermoplastic material may be that MFI provided by the resin supplier that may be provided as a certification or otherwise determined as sent from the supplier and prior to processing. A "target MFI" of a thermoplastic material may be an MFI value selected by an operator based on desired properties of the molded article. A "modified MFI" of a thermoplastic material may be the MFI determined upon adding masterbatch materials to the thermoplastic material, after the thermoplastic material has left the supplier, and/or any change in MFI inherent in a particular molding process using a particular thermoplastic material. A "limiting MFI" of a thermoplastic material may be an MFI below which a cavity or plurality of cavities may not be filled to within dimensional tolerances or without exceed shear limits of the material within the pressure and temperature limits specified by the manufacturer or supply chain of the material. An "MFI window" may refer to an allowable variation in MFI, including an upper and lower limit within which material is expected to process a part within engineering specifications. An "MFI range" may refer to a supply chain's limiting precision to which a polymer may be produced about a given molecular weight of MFI, and may also include an upper and lower limit.

The term "non-reactive additive" refers to additives that do not chemically react with the base thermoplastic resin to change the chemical structure of the base thermoplastic resin.

As used herein, the term "thermoplastic material" may include a base thermoplastic resin and any additives, often given as a percentage by weight.

Injection Molding Stage and Injection Molding Station

In a first stage of the method of the present disclosure, thermoplastic material is introduced to the injection molding apparatus through a primary hopper containing the thermoplastic material (e.g., in the form of pellets) by opening a gate. In some embodiments, the thermoplastic material may contain a mixture of a base resin and an additive as a weight percentage. In other embodiments, the thermoplastic material may contain only a base resin. The thermoplastic material is heated in a melt holder of the injection molding apparatus to a sufficient temperature (e.g., to between about 90° C. and about 295° C., such as between about 220° C. and about 250° C., such as about 243° C.) and is injected using a plastic melt injection system or injection element into a first mold cavity of the injection molding apparatus to make a molded article. As discussed in more detail below, a sensor may be used to provide a signal to a system controller indicative of viscosity of the thermoplastic material melt as it flows through the injection molding apparatus. Based on the signal, the system controller may provide an additive from a secondary hopper and/or adjust pressure at the nozzle to influence or change the viscosity and starting MFI of the thermoplastic material.

Referring now to FIG. 1, one embodiment of a substantially constant low injection pressure molding machine 10 is illustrated. The substantially constant low injection pressure molding machine 10 generally includes a plastic melt injection system 12, a clamping system 14, and a mold 28. A thermoplastic material may be introduced to the plastic melt injection system 12 in the form of thermoplastic pellets 16. The thermoplastic material may directly affect several qualities of the final plastic article, such as stresses, crystallinity, and cooling rates, as well as other qualities. Thermoplastic materials are discussed thoroughly below. The thermoplastic pellets 16 may be placed into a primary hopper 18, which feeds the thermoplastic pellets 16 into a heated barrel 20 of the plastic melt injection system 12 by opening a gate 21. The thermoplastic pellets 16, after being fed into the heated barrel 20, may be driven to the end of the heated barrel 20 by a reciprocating screw 22. The heating of the heated barrel 20 and the compression of the thermoplastic pellets 16 by the reciprocating screw 22 causes the thermoplastic pellets 16 to melt, forming a molten thermoplastic material 24. The molten thermoplastic material may be processed at a temperature of about 130° C. to about 410° C.

The reciprocating screw 22 forces the molten thermoplastic material 24 toward a nozzle 26 to form a shot of thermoplastic material, which will be injected into a plurality of mold cavities 32 of the mold 28 via an injection element, such as one or more gates 30, preferably three or less gates, that direct the flow of the molten thermoplastic material 24 to the plurality of mold cavities 32. In other embodiments, the nozzle 26 may be separated from one or more gates 30 by a feed system (not shown).

The plurality of mold cavities 32 is formed between a first mold portion 25 and a second mold portion 27 of the mold 28. The first and second mold portions 25, 27 are formed from a material having high thermal conductivity. For example, the first and second mold portions 25, 27 may be formed from a material having a thermal conductivity of between about 30 British Thermal Units (BTUs) per (hour-foot-° F.) and about 223 BTUs per (hour-foot-° F.), or between about 51.9 Watts per meter-Kelvin and about 385 Watts per meter-Kelvin. In other embodiments, one or both of the first and second mold portions 25, 27 may be formed from a material having a thermal conductivity of between about 35 BTUs per (hour-foot-° F.) and about 200 BTUs per (hour-foot-° F.); or between about 40 BTUs per (hour-foot-° F.) and about 190 BTUs per (hour-foot-° F.); or between about 50 BTUs per (hour-foot-° F.) and about 180 BTUs per (hour-foot-° F.); or between about 75 BTUs per (hour-foot-° F.) and about 150 BTUs per (hour-foot-° F.).

Some illustrative materials for manufacturing all or portions of the first and/or second mold portions 25, 27 include aluminum, copper, prehardened and hardened steels (for example, 2024 aluminum, 2090 aluminum, 2124 aluminum, 2195 aluminum, 2219 aluminum, 2324 aluminum, 2618 aluminum, 5052 aluminum, 5059 aluminum, aircraft grade aluminum, 6,000 series aluminum, 6013 aluminum, 6056 aluminum, 6061 aluminum, 6063 aluminum, 7000 series aluminum, 7050 aluminum, 7055 aluminum, 7068 aluminum, 7075 aluminum, 7076 aluminum, 7150 aluminum, 7475 aluminum, QC-10, Alumold™, Hokotol™, Duramold 2™, Duramold 5™, and/or Alumec 99™), BeCu (for example, C17200, C18000, C61900, C62500, C64700, C82500, Moldmax LH™, Moldmax HH™, and/or Protherm™), Copper, and any alloys of aluminum (e.g., Beryllium, Bismuth, Chromium, Copper, Gallium, Iron, Lead, Magnesium, Manganese, Silicon, Titanium, Vanadium, Zinc, and/or Zirconium), any alloys of copper (e.g., Magnesium, Zinc, Nickel, Silicon, Chromium, Aluminum, and/or Bronze). These materials may have Rockwell C (Rc) hardnesses of between about 0.5 Rc and about 20 Rc, preferably between about 2 Rc and about 20 Rc, more preferably between about 3 Rc and about 15 Rc, and more preferably between about 4 Rc and about 10 Rc. The first and/or second mold portions 25, 27 may be any of these materials or any combination of these materials, or may be comprised of any of these materials. For example, the mold 28 may comprise aluminum and/or an aluminum containing core. The disclosed substantially constant low injection pressure molding methods and machines operate under molding conditions that permit molds made of softer, higher thermal conductivity materials to extract useful lives of more than 1 million cycles, for example between about 1 million cycles and about 10 million cycles, particularly between about 1.25 million cycles and about 10 million cycles, and more particularly between about 2 million cycles and about 5 million cycles.

The mold 28 may also include a cooling circuit 29, integrated into or positioned proximate to either or both the first or second mold portions 25, 27. The cooling circuit 29 may provide a path for cooling fluid to pass through one or both portions of the mold 28. The cooling fluid may remove heat from the mold 28 or a portion 25, 27 of the mold, thereby reducing the temperature of the mold 28 and in some instances, reducing the temperature of an article contained within the mold cavity 32. As the cooling fluid passes through the mold 28, a cooling fluid temperature may be measured. For example, the cooling fluid temperature for water may be measured upon its fully regulated state (the regulated coolant temperature), as the cooling fluid exits the tap or controlled (e.g., using a thermolator or chiller). For example, the regulated coolant temperature may be between about 50° F. and about 100° F., such as between about 60° F. and about 80° F., such as between about 65° F. and 75° F. The cooling fluid temperature as it reaches the mold 28 may be determined by a chiller, as discussed herein. In some embodiments, the cooling circuit 29 may have a spiral flow path, while in other embodiments, the cooling circuit 29 may have a planar, curved, or other flow path.

High thermal conductivity of the mold 28 (e.g., the first mold part 25 and/or second mold part 27) may alleviate the need for dehumidification apparatuses, as differences in temperature between the mold and the ambient environment may be reduced. Further, thermal lag in the mold may be reduced due to the high thermal conductivity of the mold. This may enable the use of, for example, evaporative cooling fluids and/or closed circuit systems.

In embodiments where the mold 28 includes the plurality of mold cavities 32, overall production rates may be increased. As discussed above, for any of the embodiments of molds described herein, any of the molds can be configured in the closed position to form between 2 mold cavities and 512 mold cavities, or any integer value for mold cavities between 2 mold cavities and 512 mold cavities, or within any range formed by any of these values, such as between 64 and 512, between 128 and 512, between 4 and 288 mold cavities, between 16 and 256 mold cavities, between 32 and 128 mold cavities, etc. The shapes of the cavities of each of the plurality of mold cavities may be identical, similar, or different from each other. The mold cavities may also be formed from more than two mold portions. In embodiments where the shapes of the plurality of mold cavities are different from each other, the plurality of mold cavities may be considered a family of mold cavities.

The first and second mold portions 25, 27 are held together under pressure by a press or clamping unit 34. The press or clamping unit 34 applies a clamping force during the molding process that is greater than the force exerted by the injection pressure acting to separate the first and second mold portions 25, 27, thereby holding the first and second mold portions 25, 27 together while the molten thermoplastic material 24 is injected into the plurality of mold cavities 32. To support these clamping forces, the clamping system 14 may include a mold frame and a mold base. As discussed below, the molten thermoplastic material 24 may be injected into the plurality of mold cavities 32 at a substantially constant melt pressure of at least about 400 psi and at most about 10,000 psi. In some embodiments the molten thermoplastic material 24 may be injected into the plurality of mold cavities 32 at a substantially constant melt pressure of greater than about 6,000 psi, such as about 7,000 psi or higher, such as between about 6,000 psi and about 8,000 psi. Controlling melt pressure can facilitate use of base thermoplastic resins having a wider range of MFIs (e.g., between about 5 and about 50) in the injection molding apparatus.

Molten thermoplastic material 24 is advanced into the plurality of mold cavities 32 until the plurality of mold cavities 32 is substantially filled. The molten thermoplastic material 24 may be advanced at a melt temperature measured as the thermoplastic material 24 leaves the injection element and enters at least one of the plurality of mold cavities 32. The melt temperature may be, for example, between about 90° C. and about 300° C., such as about 243° C. The plurality of mold cavities 32 may be substantially filled when the plurality of mold cavities 32 is more than about 90% filled, particularly more than about 95% filled and more particularly more than about 99% filled. Once the shot of molten thermoplastic material 24 is injected into the plurality of mold cavities 32, the reciprocating screw 22 stops traveling forward.

A controller 50 is communicatively connected with a sensor 52, which may be located in the vicinity of the nozzle 26, the injection element or gates 30 and/or mold cavity 32. The controller 50 may include a microprocessor, a memory, and one or more communication links. When melt pressure of the thermoplastic material is measured by the sensor 52, this sensor 52 may send a signal indicative of the pressure to the controller 50 to provide a target pressure for the controller 50 to maintain in the plurality of mold cavities 32 (or in the nozzle 26) as the fill is completed. The signal may also be indicative of viscosity of the thermoplastic material melt as MFI is a measure of the ability of the material's melt to flow under pressure. Other feedback signals may be provided indicative of viscosity, such as screw torque and injection speed. In some embodiments, a rheometer may be provided to measure viscosity directly and provide a signal to the controller 50.

Figure 2:
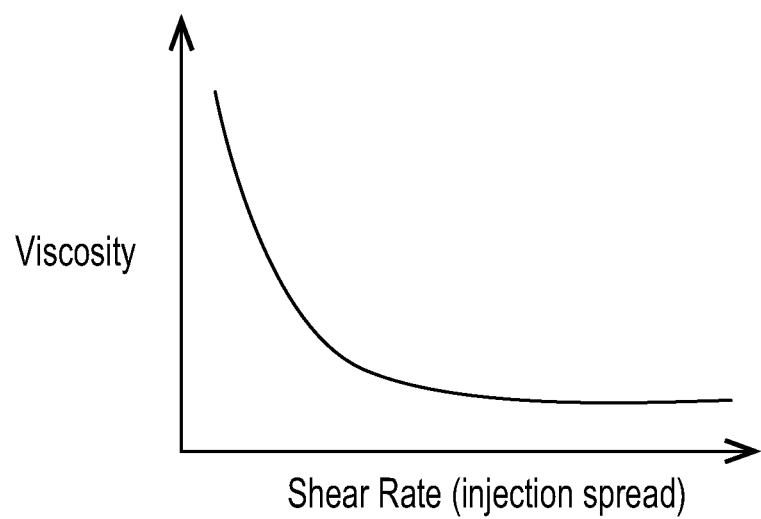
FIG. 2 illustrates an exemplary plot of viscosity vs. shear rate (injection speed) for an exemplary polymer material.

FIG. 2 illustrates an exemplary curve illustrating the non-Newtonian behavior of most polymers. As can be seen, using injection time information as an example, as injection time decreases, the shear rate increases and viscosity of the molten thermoplastic material decreases, with a steeper drop in viscosity at slower injection times. Generally, at higher injection speeds, viscosity of the thermoplastic material levels off somewhat compared to slower injection speeds.

Referring back to FIG. 1, the signal from the sensor 52 may generally be used to control the molding process, such that variations in material viscosity (and MFI) can be adjusted by the controller 50. These adjustments may be made immediately during the molding cycle, or corrections can be made in subsequent cycles. For example, the controller 50 may control delivery of an additive 51 from a secondary hopper 53 by opening and closing gate 55 to allow a selected amount of additive 51 to mix with the molten thermoplastic material. The amount of additive 51 may be determined by the controller 50, for example, based on the signal received by the sensor 52 or the amount of additive 51 may be selected by an operator or pre-set (e.g., in small amounts to be added as needed). Furthermore, several signals may be averaged over a number of cycles and then used to make adjustments to the molding process by the controller 50. The controller 50 may be connected to the sensor 52 and the screw control 36 (and other components, such as the gates of the hoppers) via wired connections 54, 56, respectively. In other embodiments, the controller 50 may be connected to the sensor 52 and screw control 36 via a wireless connection or any other type of suitable communication connection that will allow the controller 50 to communicate with both the sensor 52 and the screw control 36 (e.g., a feedback loop).

In the embodiment of FIG. 1, the sensor 52 is a pressure sensor that measures (directly or indirectly) melt pressure of the molten thermoplastic material 24 in the vicinity of the nozzle 26. The sensor 52 generates an electrical signal that is transmitted to the controller 50. The controller 50 can then command the screw control 36 to advance the screw 22 at a rate that maintains or otherwise adjust toward a desired melt pressure of the molten thermoplastic material 24 in the nozzle 26. While the sensor 52 may directly measure the melt pressure, the sensor 52 may also indirectly measure the melt pressure by measuring other characteristics of the molten thermoplastic material 24, such as temperature, viscosity, flow rate, etc., which are indicative of melt pressure. Likewise, the sensor 52 need not be located directly in the nozzle 26, but rather the sensor 52 may be located at any location within the plastic melt injection system 12 or mold 28 that is fluidly connected with the nozzle 26. If the sensor 52 is not located within the nozzle 26, appropriate correction factors may be applied to the measured characteristic to calculate an estimate of the melt pressure in the nozzle 26. The sensor 52 need not be in direct contact with the injected material and may alternatively be in dynamic communication with the material and able to sense the pressure of the material and/or other fluid characteristics. If the sensor 52 is not located within the nozzle 26, appropriate correction factors may be applied to the measured characteristic to calculate the melt pressure in the nozzle 26. In yet other embodiments, the sensor 52 need not be disposed at a location that is fluidly connected with the nozzle 26. Rather, the sensor 52 could measure clamping force generated by the clamping system 14 at a mold parting line between the first and second mold portions 25, 27. In one aspect, the controller 50 may maintain the pressure according to the input from sensor 52. Alternatively, the sensor 52 could measure an electrical power demand by an electric press, which may be used to calculate an estimate of the pressure in the nozzle 26.

Although an active, closed loop controller 50 is illustrated in FIG. 1, other pressure regulating devices may be used in addition to the controller 50. For example, a pressure regulating valve or a pressure relief valve may be used to regulate the melt pressure of the molten thermoplastic material 24. More specifically, the pressure regulating valve and pressure relief valve can prevent overpressurization of the mold 28. Another mechanism for preventing overpressurization of the mold 28 is an alarm that is activated when an overpressurization condition is detected.

The substantially constant low injection pressure molding machine 10 may further use another sensor (also represented by element 52 in FIG. 1 above) located near an end of flow position (i.e., near an end of the mold cavity) to monitor changes in material viscosity, changes in material temperature, and changes in other material properties. Measurements from this sensor may be communicated to the controller 50 to allow the controller 50 to correct the process in real time to ensure the melt front pressure is relieved or to make viscosity modifications to the thermoplastic material prior to the melt front reaching the end of the plurality of mold cavities 32. Moreover, the controller 50 may use the sensor measurements to adjust the peak power and peak flow rate points in the process, so as to achieve consistent processing conditions. In addition to using the sensor measurements to fine tune the process in real time during the current injection cycle, the controller 50 may also adjust the process over time (e.g., over a plurality of injection cycles). In this way, the current injection cycle can be corrected based on measurements occurring during one or more cycles at an earlier point in time. In one embodiment, sensor readings can be averaged over many cycles so as to achieve process consistency.

Figure 3:
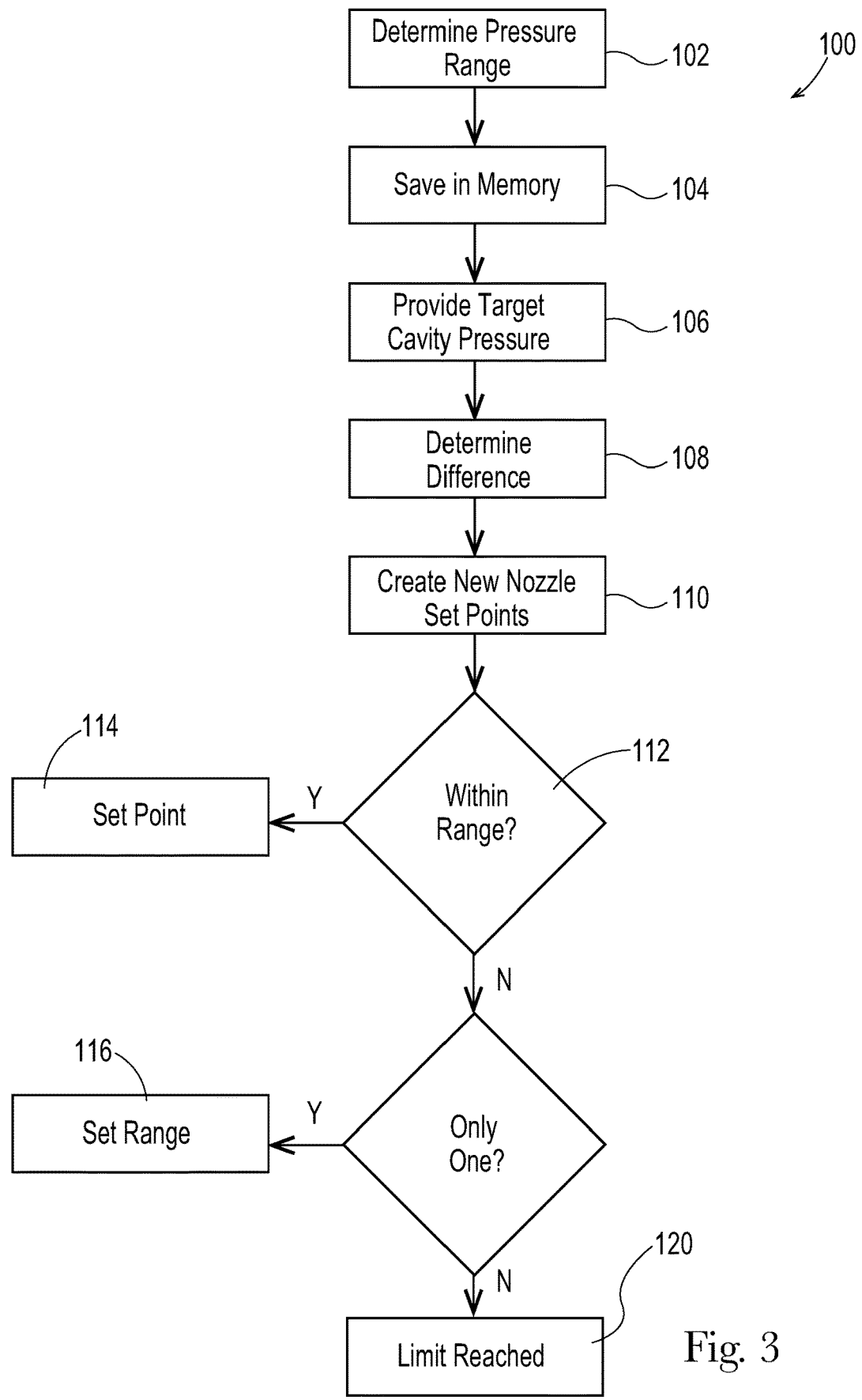
FIG. 3 illustrates an exemplary process for providing automatic nozzle pressure adjustments to account for changes in melt viscosity in real time according to one or more embodiments described herein.

Referring to FIG. 3, an exemplary process 100 providing automatic nozzle pressure adjustments to account for changes in viscosity in real time and to target a constant mold cavity pressure is illustrated. Generally, an operator may run samples of a thermoplastic material on the injection molding apparatus 10 to determine a high and low nozzle pressure range, across an anticipated MFI variation for that thermoplastic material at step 102. These high and low nozzle pressure range values may be provided to the controller 50 and saved in memory at step 104. These high and low range values can be used by the controller 50 to set limits between which nozzle pressures can be adjusted. The operator can track cavity pressures for samples that produced acceptable articles and provide a target cavity pressure to the controller 50 at step 106, which the controller 50 will make adjustments to maintain.

Every $n^{th}$ cycle, that may be configurable by the operator (e.g., 10 cycles). The controller 50 may conduct an algorithm saved in memory to adjust nozzle pressure in order to maintain constant cavity pressure at the target cavity pressure. As one example for n equal to 10 cycles, at step 108 the difference between peak cavity pressure from the previous shot and target cavity pressure is determined. At step 110, a multiple of 1/n and the resultant from step 108 (positive or negative integer) is summed to the nozzle pressure set point over the next n cycles to create new nozzle set points. At step 112, a logic check is performed to determine if the new nozzle set point falls within the allowable high and low nozzle pressure range determined in step 102. If the new nozzle set point falls within the allowable nozzle pressure range, the new nozzle set point becomes the set point for the next cycle at step 114. If the new nozzle set point falls outside the allowable pressure range, the high and low values of the allowable nozzle pressure range may be used, depending if the new nozzle set point is high outside the allowable range or low outside the allowable range at step 116. If two consecutive cycles have new nozzle set points outside the allowable range 118, then an indication such as "Nozzle Range Limit Reached" may be provided to the operator at step 120. Steps 110 and 112 are repeated for the remaining cycles and then all of the steps are repeated again from the beginning. Table 1 below illustrates an exemplary process sequence performed by the controller 50 shot-to-shot.

TABLE 1

| Iteration | Current Nozzle Pressure | Cavity Pressure Set Point | Cavity Pressure | Delta | 10% Delta | New Nozzle |
|---|---|---|---|---|---|---|
| 1 | 5000 | 7400 | 5000 | 2400 | 240 | 5240 |
| 2 | 5240 | 7400 | 5240 | 2160 | — | 5480 |
| 3 | 5480 | 7400 | 5480 | 1920 | — | 5720 |
| 4 | 5720 | 7400 | 5720 | 1680 | — | 5960 |
| 5 | 5960 | 7400 | 5960 | 1440 | — | 6200 |

TABLE 1-continued

| Iteration | Current Nozzle Pressure | Cavity Pressure Set Point | Cavity Pressure | Delta | 10% Delta | New Nozzle |
|---|---|---|---|---|---|---|
| 6 | 6200 | 7400 | 6200 | 1200 | — | 6440 |
| 7 | 6440 | 7400 | 6440 | 960 | — | 6680 |
| 8 | 6680 | 7400 | 6680 | 720 | — | 6920 |
| 9 | 6920 | 7400 | 6920 | 480 | — | 7160 |
| 10 | 7160 | 7400 | 7160 | 240 | — | 7400 |

During n equals 10 cycles, the nozzle pressure may be incrementally raised until the target cavity pressure is reached. Using increments of +10% can gradually increase nozzle pressure slowly, in a controlled manner. Working with an allowable range of nozzle pressures can ensure that nozzle pressure does not exceed demonstrated allowances. Such an approach can be used to adjust and fine-tune the process to account for real-time changes in viscosity of the thermoplastic material.

Referring back to FIG. 1, upon injection into the plurality of mold cavities 32, the molten thermoplastic material 24 contacts a mold contact surface 33 within each mold cavity 32, takes the form of the plurality of mold cavities 32 and the molten thermoplastic material 24 cools inside the mold 28 until the thermoplastic material 24 solidifies or is substantially frozen. The molten thermoplastic material 24 may be actively cooled with an active cooling apparatus that includes a cooling liquid flowing through at least one of the first and second mold portions 25, 27, or passively cooled through convection and conduction to the atmosphere. Once the thermoplastic material 24 has solidified, the press 34 releases the first and second mold portions 25, 27. At which point, the first and second mold portions 25, 27 are separated from one another, and the article may be ejected from the mold 28. The article may be ejected or removed by, for example, ejection, dumping, releasing, removing, extraction (manually or via an automated process, including robotic action), pulling, pushing, gravity, or any other method of separating the cooled article from the first and second mold portions 25, 27. After the cooled article is removed from the first and second mold portions 25, 27, the first and second mold portions 25, 27 may be closed, reforming the plurality of mold cavities 32. The reforming of the plurality of mold cavities 32 prepares the first and second mold portions 25, 27 to receive a new shot of molten thermoplastic material, thereby completing a single mold cycle. Cycle time is defined as a single iteration of the molding cycle. A single molding cycle for a one step injection blow molding cycle may take between about 2 seconds and about 15 seconds, preferably between about 8 seconds and about 10 seconds, depending on the part size and material. A single molding cycle for a one and a half or a two step injection blow molding cycle may take between, for example, about 8 seconds and about 60 seconds, depending on the part size and material.

In various embodiments, the mold 28 may include the cooling system or cooling circuit 29. The cooling system or cooling circuit may assist in maintaining a portion of, or the entire, mold 28 and/or plurality of mold cavities 32 at a temperature below the no-flow temperature of the thermoplastic material 24. For example, even surfaces of the plurality of mold cavities 32 which contact the shot comprising molten thermoplastic material 24 can be cooled to maintain a lower temperature. Any suitable cooling temperature can be used, such as about 10° C. For example, the mold 28 can be maintained substantially at room temperature. Incorporation of such cooling systems can advantageously enhance the rate at which the as-formed injection molded part is cooled and ready for ejection from the mold. Additionally, because of the high thermal conductivity of the molds described herein, the mold may not retain all or most of the heat, as heat transferred to the mold may be subsequently transferred to the cooling fluid over a short period of time. For example, the mold 28 may have or maintain a temperature of greater than or equal to about 90° C. during the injection stage of the molten thermoplastic material, which may avoid condensation on or around the mold 28, thereby eliminating the need for dehumidification apparatuses.

Cooling circuits may allow for heat to be removed from the plurality of mold cavities 32, and for the temperature of the article formed within the plurality of mold cavities 32 to be reduced. The cooling circuit may be, for example, a spiral cooling circuit positioned in both the first and second mold portions 25, 27. In other embodiments, the cooling circuit may comprise straight tubing. The cooling circuit may be configured to direct a cooling fluid, such as water, to and away from the first and second mold portions 25, 27 such that heat is removed from the plurality of mold cavities 32 (and thus the thermoplastic material) and transferred to the cooling fluid. The cooling fluid may be fluidically coupled to a chiller system to remove heat retained in the cooling fluid. Due to the thermal conductivity of the mold 28, the heat transferred to the cooling fluid from the mold 28 should be fairly uniform and efficient, in that the temperature throughout the mold 28 should remain substantially similar. Heat removed from the mold 28 may further remove heat from the article, resulting in substantially balanced cooling and more efficient cooling for the article, which may reduce stresses molded into the article, and may also substantially balance, or otherwise make more uniform, stresses molded into the article.

Figure 4:
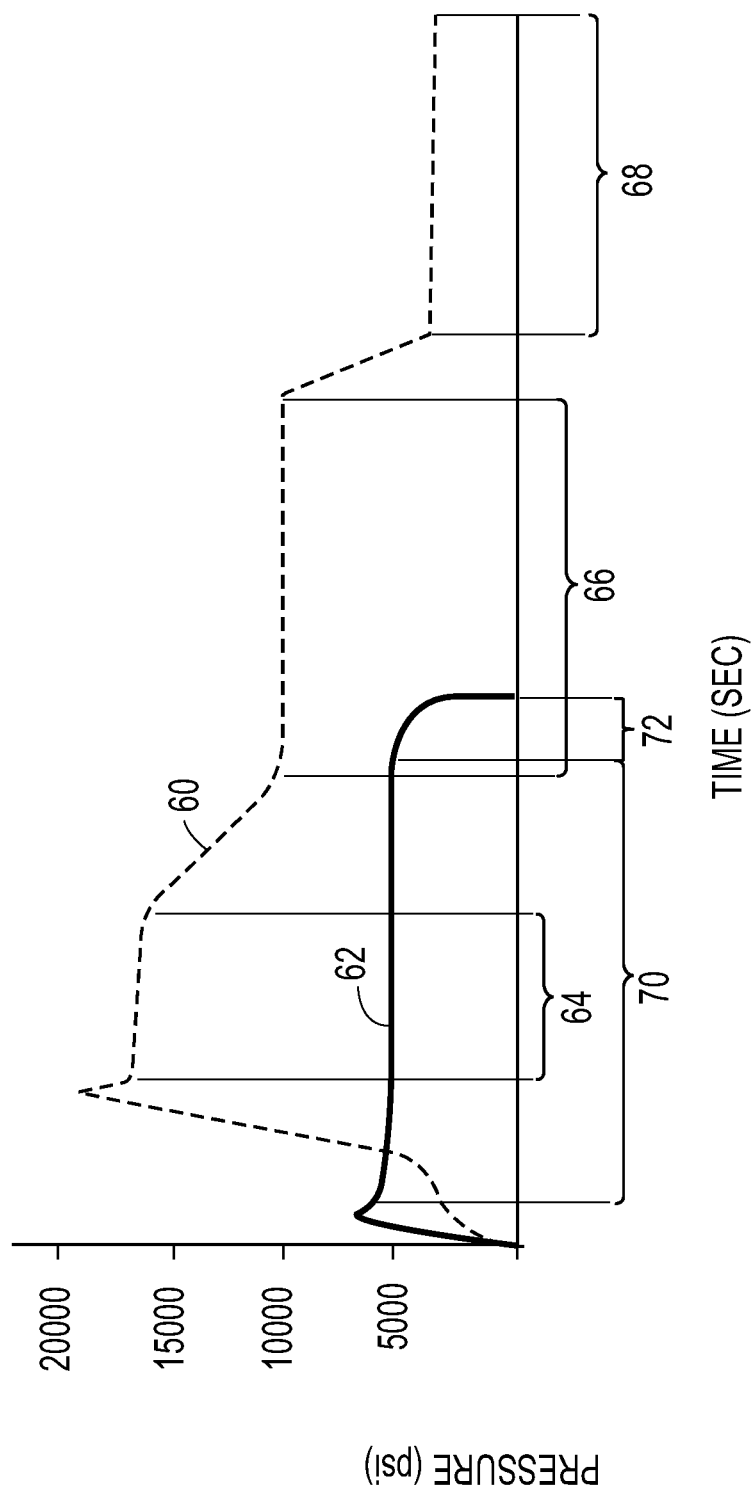
FIG. 4 is a cavity pressure vs. time graph for the substantially constant low injection pressure molding machine of FIG. 1 superimposed over a cavity pressure vs. time graph for a conventional high variable pressure injection molding apparatus.

Referring now to FIG. 4, a typical pressure-time curve for a conventional high variable pressure injection molding process is illustrated by the dashed line 60. By contrast, a pressure-time curve for the disclosed substantially constant low injection pressure molding machine is illustrated by the solid line 62.

In the conventional case, melt pressure is rapidly increased to well over about 15,000 psi and then held at a relatively high pressure, more than about 15,000 psi, for a first period of time 64. The first period of time 64 is the fill time in which molten plastic material flows into the mold cavity. Thereafter, the melt pressure is decreased and held at a lower, but still relatively high pressure, typically about 10,000 psi or more, for a second period of time 66. The second period of time 66 is a packing time in which the melt pressure is maintained to ensure that all gaps in the mold cavity are back filled. After packing is complete, the pressure may optionally be dropped again for a third period of time 68, which is the cooling time. The mold cavity in a conventional high variable pressure injection molding system is packed from the end of the flow channel back to towards the gate. The material in the mold typically freezes off near the end of the cavity, then the completely frozen off region of material progressively moves toward the gate location, or locations. As a result, the plastic near the end of the mold cavity is packed for a shorter time period and with reduced pressure, than the plastic material that is closer to the gate location, or locations. Part geometry, such as very thin cross sectional areas midway between the gate and end of mold cavity, can also influence the level of packing pressure in regions of the mold cavity. Inconsistent packing pressure may cause inconsistencies in the finished product, including uneven wall thickness, unbalanced stresses, and high levels of crystallinity. Moreover, the conventional packing of plastic in various stages of solidification results in some non-ideal material properties, for example, molded-in stresses, sink, and non-optimal optical properties.

The substantially constant low injection pressure molding machine 10, on the other hand, injects the molten plastic material into the mold cavity at a substantially constant pressure for a fill time period 70. The injection pressure in the example of FIG. 4 is less than 6,000 psi. Other embodiments may use lower pressures. After the mold cavity is filled, the substantially constant low injection pressure molding machine 10 gradually reduces pressure over a second time period 72 as the molded part is cooled. By using a substantially constant pressure, the molten thermoplastic material maintains a continuous melt flow front that advances through the flow channel from the gate towards the end of the flow channel. In other words, the molten thermoplastic material remains moving throughout the mold cavity, which prevents premature freeze off. Thus, the plastic material remains relatively uniform at any point along the flow channel, which results in a more uniform and consistent finished product. By filling the mold with a relatively uniform pressure, the finished molded parts form crystalline structures that may have better mechanical and optical properties than conventionally molded parts. Moreover, the parts molded at constant pressures exhibit different characteristics than skin layers of conventionally molded parts. As a result, parts molded under constant pressure may have better optical properties than parts of conventionally molded parts.

Turning now to FIG. 5, the various stages of fill are broken down as percentages of overall fill time. For example, in a conventional high variable pressure injection molding process, the fill period 64 makes up about 10% of the total fill time, the packing period 66 makes up about 50% of the total fill time, and the cooing period 68 makes up about 40% of the total fill time. On the other hand, in the substantially constant pressure injection molding process described herein, the fill period 70 makes up about 90% of the total fill time while the cooling period 72 makes up only about 10% of the total fill time. The substantially constant pressure injection molding process needs less cooling time because the molten plastic material is cooling as it is flowing into the mold cavity. Thus, by the time the mold cavity is filled, the molten plastic material has cooled significantly, although not quite enough to freeze off in the center cross section of the mold cavity, and there is less total heat to remove to complete the freezing process. Additionally, because the molten plastic material remains liquid throughout the fill, and packing pressure is transferred through this molten center cross section, the molten plastic material remains in contact with the mold cavity walls (as opposed to freezing off and shrinking away). As a result, the substantially constant pressure injection molding process described herein is capable of filling and cooling a molded part in less total time than in a conventional high variable pressure injection molding process.

Peak power and peak flow rate vs. percentage of mold cavity fill are illustrated in FIG. 5 for both conventional high variable pressure processes 60 and for substantially constant pressure processes 62. In the substantially constant pressure process 62, the peak power load occurs at a time approximately equal to the time the peak flow rate occurs, and then declines steadily through the filling cycle. More specifically, the peak power and the peak flow rate occur in the first 30% of fill, and, in another example, in the first 20% of fill, and, in yet another example, in the first 10% of fill. By arranging the peak power and peak flow rate to occur during the beginning of fill, the thermoplastic material is not subject to the extreme conditions when it is closer to freezing. It is believed that this results in superior physical properties of the molded parts.

The power level generally declines slowly through the filling cycle following the peak power load. Additionally, the flow rate generally declines slowly through the filling cycle following the peak flow rate because the fill pressure is maintained substantially constant. As illustrated above, the peak power level is lower than the peak power level for a conventional process, generally from about 30 to about 50% lower and the peak flow rate is lower than the peak flow rate for a conventional process, generally from about 30 to about 50% lower.

Similarly, the peak power load for a conventional high variable pressure process occurs at a time approximately equal to the time the peak flow rate occurs. However, unlike the substantially constant process, the peak power and flow rate for the conventional high variable pressure process occur in the final 10%-30% of fill, which subjects the thermoplastic material to extreme conditions as it is in the process of freezing. Also unlike the substantially constant pressure process, the power level in the conventional high variable pressure process generally declines rapidly through the filling cycle following the peak power load. Similarly, the flow rate in a conventional high variable pressure process generally declines rapidly through the filling cycle following the peak flow rate.

Alternatively, in one or more embodiments shown and described herein, the peak power may be adjusted to maintain a substantially constant injection pressure. More specifically, the filling pressure profile may be adjusted to cause the peak power to occur in the first 30% of the cavity fill, in another example, in the first 20% of the cavity fill, and, in yet another example, in the first 10% of the cavity fill. Adjusting the process to cause the peak power to occur within the specific ranges, and then to have a decreasing power throughout the remainder of the cavity fill results in the same benefits for the molded part that were described above with respect to adjusting peak flow rate. Moreover, in one or more embodiments of the substantially constant pressure injection molding method and/or machine, adjusting the process in the manner described may be used for thin wall parts (e.g., L/T ratio >100) and for large shot sizes (e.g., more than 50 cc, in particular more than 100 cc).

Turning now to FIGS. 6A-6D and FIGS. 7A-7D a portion of a mold cavity as it is being filled by a conventional high variable pressure injection molding apparatus (FIGS. 6A-6D) and as it is being filled by a substantially constant pressure injection molding apparatus (FIGS. 7A-7D) of the disclosure herein is illustrated.

Figure 6A:
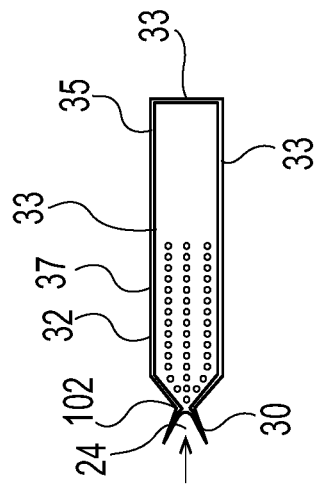
FIG. 6A is a side cross-sectional view of a portion of a mold cavity in a first stage of fill by a conventional high variable pressure injection molding apparatus.
Figure 6B:
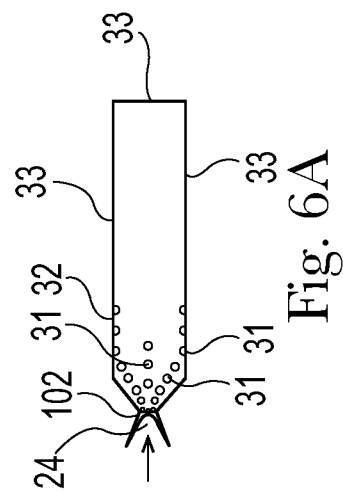
FIG. 6B is a side cross-sectional view of the portion of the mold cavity illustrated in FIG. 6A in a second stage of fill by the conventional high variable pressure injection molding apparatus.
Figure 6C:
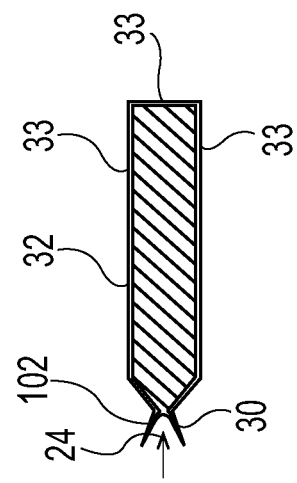
FIG. 6C is a side cross-sectional view of the portion of the mold cavity illustrated in FIG. 6A in a third stage of fill by the conventional high variable pressure injection molding apparatus.
Figure 6D:
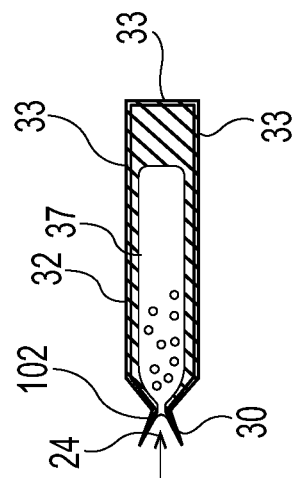
FIG. 6D is a side cross-sectional view of the portion of the mold cavity illustrated in FIG. 6A in a final stage of fill by the conventional high variable pressure injection molding apparatus.

As illustrated in FIGS. 6A-6D, as the conventional high variable pressure injection molding apparatus begins to inject molten thermoplastic material 24 into a plurality of mold cavities 32 through the gate 30, the high injection pressure tends to inject the molten thermoplastic material 24 into the plurality of mold cavities 32 at a high rate of speed, which causes the molten thermoplastic material 24 to flow in laminates 31, most commonly referred to as laminar flow (FIG. 6A). These outermost laminates 31 adhere to mold article contact surfaces 33 of the mold cavity and subsequently cool and freeze, forming a frozen boundary layer 37 (FIG. 6B), before the plurality of mold cavities 32 is completely full. As the thermoplastic material freezes, however, it also shrinks away from the wall of the plurality of mold cavities 32, leaving a gap 35 between the mold cavity wall and the boundary layer 37. This gap 35 reduces cooling efficiency of the mold. Molten thermoplastic material 24 also begins to cool and freeze in the vicinity of the gate 30, which reduces the effective cross-sectional area of the gate 30. In order to maintain a constant volumetric flow rate, the conventional high variable pressure injection molding apparatus must increase pressure to force molten thermoplastic material through the narrowing gate 30. As the thermoplastic material 24 continues to flow into the plurality of mold cavities 32, the boundary layer 37 grows thicker (FIG. 6C). Eventually, the entire plurality of mold cavities 32 is substantially filled by thermoplastic material that is frozen (FIG. 6D). At this point, the conventional high pressure injection molding apparatus must maintain a packing pressure to push the receded boundary layer 37 back against the plurality of mold cavities 32 walls to increase cooling.

Referring now to FIGS. 7A-7D, the substantially constant low injection pressure molding machine 10, on the other hand, flows molten thermoplastic material into a plurality of mold cavities 32 with a constantly moving flow front 39. The thermoplastic material 24 behind the flow front 39 remains molten until the mold cavity 32 is substantially filled (i.e., about 99% or more filled) before freezing. As a result, there is no reduction in effective cross-sectional area of the gate 30, and a constant injection pressure is maintained. Moreover, because the thermoplastic material 24 is molten behind the flow front 39, the thermoplastic material 24 remains in contact with the walls of the plurality of mold cavities 32. As a result, the thermoplastic material 24 is cooling (without freezing) during the fill portion of the molding process. Thus, the cooling portion of the injection molding process need not be as long as a conventional process.

Because the thermoplastic material remains molten and keeps moving into the plurality of mold cavities 32, less injection pressure is required than in conventional molds. In addition, the method facilitated use of thermoplastic materials having a wider range of MFIs as the viscosity of the thermoplastics materials can reduce up to about 300 percent at the constant injection pressures, while maintaining consistent part quality. In one embodiment, the injection pressure may be about 6,000 psi or less. As a result, the injection systems and clamping systems need not be as powerful. For example, the disclosed substantially constant injection pressure devices may use clamps requiring lower clamping forces, and a corresponding lower clamping power source. Moreover, the disclosed injection molding apparatus, because of the lower power requirements, may employ electric presses, which are generally not powerful enough to use in conventional high variable pressure injection molding method and/or machine (e.g., class 101 and 102 injection molding apparatus). Even when electric presses are sufficient to use for some simple, molds with few mold cavities, the process may be improved with the disclosed substantially constant injection pressure methods and devices as smaller, less expensive electric motors may be used. The disclosed constant pressure injection molding apparatus may comprise one or more of the following types of electric presses, a direct servo drive motor press, a dual motor belt driven press, a dual motor planetary gear press, and a dual motor ball drive press having a power rating of 200 HP or less.

When filling at a substantially constant pressure, it was conventionally thought that the filling rates would need to be reduced relative to conventional filling methods. This means the polymer would be in contact with the cool molding surfaces for longer periods before the mold would completely fill. Thus, more heat would need to be removed before filling, and this would be expected to result in the material freezing off before the mold is filled. However, to the contrary, when using the substantially constant injection pressure molding machines and methods shown and described herein, the thermoplastic material will flow when subjected to substantially constant pressure conditions despite a portion of the mold cavity being below the no-flow temperature of the thermoplastic material. It would be generally expected by one of ordinary skill in the art that such conditions would cause the thermoplastic material to freeze and plug the mold cavity, particularly when using lower MFI materials, rather than continue to flow and fill the entire mold cavity. Without intending to be bound by theory, it is believed that the substantially constant pressure conditions of embodiments of the disclosed method and device allow for dynamic flow conditions (i.e., constantly moving melt front) throughout the entire mold cavity during filling, which also facilitates use of thermoplastic materials having a wider range of MFIs and MFI variability. There is no hesitation in the flow of the molten thermoplastic material as it flows to fill the mold cavity and, thus, no opportunity for freeze-off of the flow despite at least a portion of the mold cavity being below the no-flow temperature of the thermoplastic material and use of a wider range of MFI materials, including use of more regrind materials.

Additionally, it is believed that as a result of the dynamic flow conditions, the molten thermoplastic material is able to maintain a temperature higher than the no-flow temperature, despite being subjected to such temperatures in the mold cavity, as a result of shear heating. It is further believed that the dynamic flow conditions interfere with the formation of crystal structures in the thermoplastic material as it begins the freezing process. Crystal structure formation increases the viscosity of the thermoplastic material, which can prevent suitable flow to fill the cavity. The reduction in crystal structure formation and/or crystal structure size can allow for a decrease in the thermoplastic material viscosity as it flows into the cavity and is subjected to the low temperature of the mold that is below the no-flow temperature of the material.

Figure 7A:
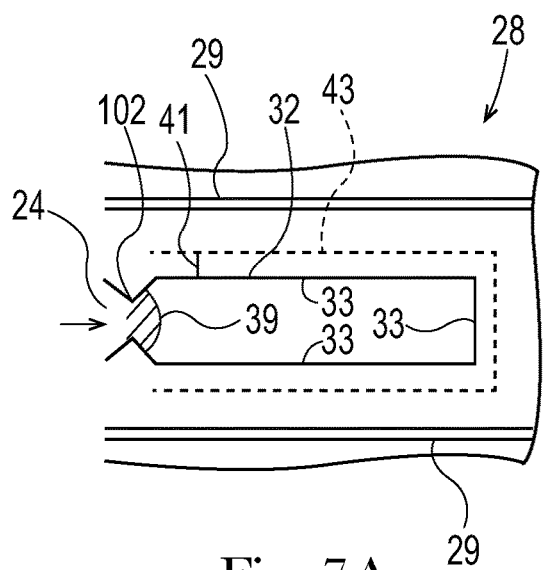
FIG. 7A is a side cross-sectional view of a portion of a mold cavity in a first stage of fill by the substantially constant low injection pressure molding machine of FIG. 1.
Figure 7B:
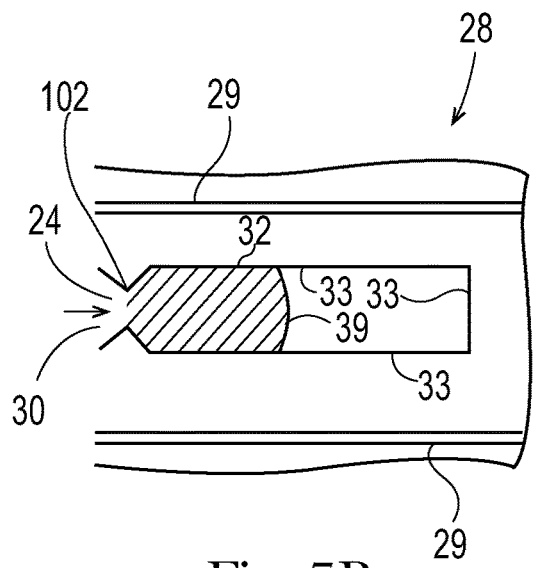
FIG. 7B is a side cross-sectional view of the portion of the mold cavity of FIG. 7A in a second stage of fill by the substantially constant low injection pressure molding machine of FIG. 1.
Figure 7C:
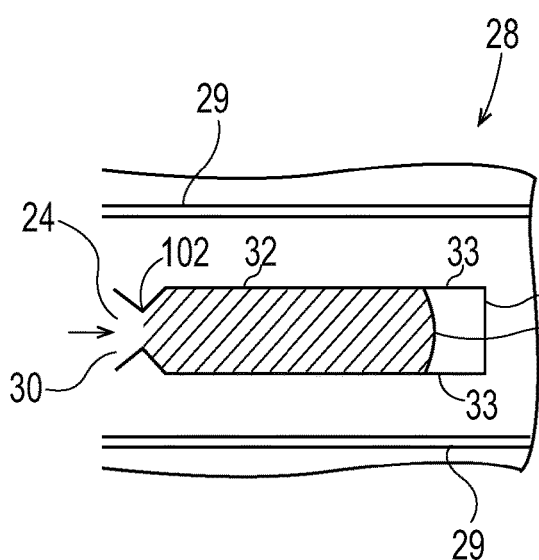
FIG. 7C is a side cross-sectional view of the portion of the mold cavity of FIG. 7A in a third stage of fill by the substantially constant low injection pressure molding machine of FIG. 1.
Figure 7D:
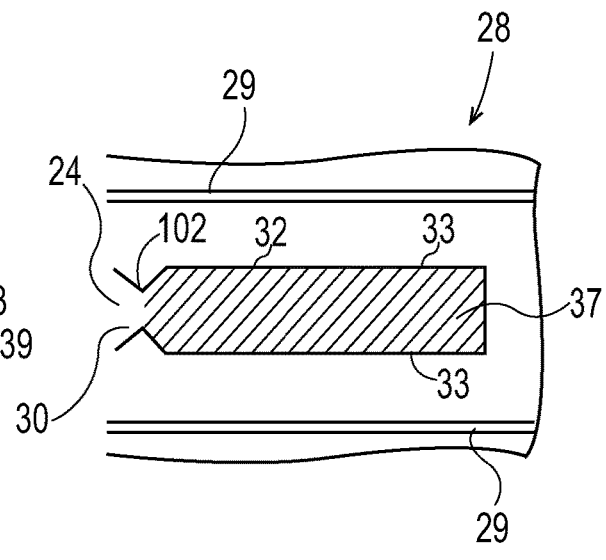
FIG. 7D is a side cross-sectional view of the portion of the mold cavity of FIG. 7A in a final stage of fill by the substantially constant low injection pressure molding machine of FIG. 1.

Once the material is injected, the article and, optionally the cavity, may be cooled. The article and the cavity may be allowed to cool passively or actively. Passive cooling could involve simply leaving the article to cool naturally within the mold. Active cooling may involve using a further device to assist and accelerate cooling. Active cooling may be achieved by passing a coolant, typically water, close to the mold, or blowing cool air, as another coolant example, at the cavity and/or product. The coolant absorbs the heat from the mold and keeps the mold at a suitable temperature to solidify the material at the most efficient rate. The mold (e.g., mold 28) can be opened when the part has solidified sufficiently to retain its shape, enabling the material to be demolded from the mold cavity without damage. However, the article may not be ejected from the molding unit. If the article has a collar, the collar of the article may be actively cooled to reduce deformation. In some embodiments, the article is cooled using coolant which passed close to, but separate from the molding unit. Cooling can take from 1-15 seconds, such as 2-10 seconds, such as 3-8 seconds. Actively cooling is beneficial to decreasing cycle times of the manufacturing process. In FIG. 7A, for example, the cooling circuit 29 is illustrated. Cooling fluid temperature may be measured as it flows near the mold cavity 32, and mold temperature may be measured or calculated at a measuring point 42 that is a distance 41 away from the mold article contact surface 33. In some embodiments, the distance 41 may be 2 millimeters, while in other embodiments the distance 41 may be 2 centimeters, for example.

The article is preferably allowed to cool to a point below the glass transition temperature of the material. At temperatures below the glass transition temperature, the article rapidly solidifies, retaining its shape. For example, polypropylene is cooled to a temperature of about 50° C. to about 100° C., particularly from about 50 to about 60° C. In a particularly embodiment, the collar of the article is permitted to cool, preferably below about 50 to about 60° C. so that it retains its molded shape. Fast cooling of the cavity and/or article can add gloss or shine to portions of the outer surface thereof.

Further stages may be incorporated into the injection molding method of the present disclosure. In one embodiment, multiple injection stages or co-injection stages may be included. In this embodiment, a first material may be injected into the mold cavity to produce a first portion of the article. The first portion of the article may then be cooled to a temperature low enough to allow further mold operations without damaging or unintentionally modifying the first portion of the article. After the first portion of the article is cooled and sufficiently solid, the mold cavity shape is changed. A second material can then be co-injected into the new cavity shape to make a second portion of the article. The second material may be chemically distinct from the first material. The article is made in such a way that the materials from the first and second injections are in direct contact with one another, allowing the materials to bond. Hence, the temperature of both portions of the article is preferably sufficient to achieve bonding. The second material to be injected can be the same material as the first material, or different. Alternatively two materials may be co-injected simultaneously into the first cavity during a co-injection technique.

Equipment to achieve multiple injection stages may be known as a core-back technology. Once the first material has been injected into the cavity and is sufficiently cooled, a core unit, or core-back, is removed creating an open space in the cavity which was previously not accessible to the first material at the time of the injection. Since the first material has now been formed and cooled, it cannot flow to occupy the newly made space. A second injection can then take place, preferably at a different injection location within the newly open cavity space, to inject a second material, adding an additional feature to the article. The injection stages of either or both of the first and second materials may incorporate the substantially constant low injection pressures described herein, which may provide the same benefits obtained in single material injection articles.

If both the first and the second materials are the same or chemically similar, thermal bonding between them is improved. It is also possible to inject different thermoplastic material, and although bonding between them is more difficult, it allows the product to have multiple characteristics, such as different transparency, opacity or flexibility.

Creating the article from two materials permits the manufacturer to treat the materials and the injected products thereof differently. For example, where the first material is used to make the collar of the article, it may be cooled more quickly than the second material. In this way, a article may be built comprising further features, or use different color materials, materials with different translucency, or different materials (any or all of which may affect MFI of the thermoplastic material) to perform different functions or provide different aesthetics.

In embodiments where the injection molding stage is electric driven, rather than hydraulic driven, the machinery footprint may be reduced. With a reduced footprint, faster and/or lighter spin/cube molds may be used.

Thermoplastic Materials

The article and plastic articles discussed herein are made using a thermoplastic material. Any suitable base thermoplastic material may be useful herein. Such base thermoplastic materials may include normally solid polymers and resins. In general, any solid polymer of an aliphatic mono-1-olefin can be used. Examples of such materials include polymers and copolymers of aliphatic mono-1-olefins, such as ethylene, propylene, butene-1, hexene-1, octene-1, and the like, and blends of these polymers and copolymers. Polymers of aliphatic mono-1-olefins having a maximum of 8 carbon atoms per molecule and no branching nearer the double bond than the fourth position provide products having particularly desirable properties. Other thermoplastic materials that can be used in the practice of the disclosure include the acrylonitrile-butadiene-styrene resins, cellulosics, copolymers of ethylene and a vinyl monomer with an acid group such as methacrylic acid, phenoxy polymers, polyamides, including polyamide-imide (PAI), polycarbonates, vinyl copolymers and homopolymer, polymethylmethacrylate, polycarbonate, diethyleneglycol bisarylcarbonate, polyethylene naphthalate, polyvinyl chloride, polyurethane, epoxy resin, polyamide-based resins, low-density polyethylene, high-density polyethylene, low-density polypropylene, high-density polypropylene, polyethylene terephthalate, styrene butadiene copolymers, acrylonitrile, acrylonitrile-butadiene copolymer, cellulose acetate butyrate and mixtures thereof, polyaryletherketone (PAEK or Ketone), polybutadiene (PBD), polybutylene (PB, Polybutylene terephthalate (PBT), Polyetheretherketone (PEEK), Polyetherimide (PEI), Polyethersulfone (PES), Polyethylenechlorinates (PEC), Polyimide (PI), Polylactic acid (PLA), Polymethylpentene (PMP), Polyphenylene oxide (PPO), Polyphenylene sulfide (PPS), Polyphthalamide (PPA), Polystyrene (PS), Polysulfone (PSU), Polyvinyl chloride (PVC), Polyvinylidene chloride (PVDC), and Spectralon. Further preferred materials include Ionomers, Kydex, a trademarked acrylic/PVC alloy, Liquid Crystal Polymer (LCP), Polyacetal (POM or Acetal), Polyacrylates (Acrylic), Polyacrylonitrile (PAN or Acrylonitrile), Polyamide (PA or Nylon), Polyamide-imide (PAI), Polyaryletherketone (PAEK or Ketone), Polybutadiene (PBD), Polybutylene (PB), Polybutylene terephthalate (PBT), Polyethylene furanoate (PEF), Polyethylene terephthalate glycol-modified (PETG), Poly(cyclohexanedimethylene terephthalate) (PCT), Poly(cyclohexanedimethylene terephthalate) glycol modified (PCTG), Poly(cyclohexylene dimethylene terephthalate) acid (PCTA), and Polytrimethylene terephthalate (PTT), and mixtures thereof.

Other thermoplastic materials that can be used in the practice of the disclosure include the group of thermoplastic elastomers, known as TPE, which include styrenic block copolymers, polyolefin blends, elastomeric alloys (TPE-v and TPV), thermoplastic polyurethanes (TPU), thermoplastic copolyester and thermoplastic polyamides.

Additional illustrative thermoplastic materials are those selected from the group consisting of polyolefins and derivatives thereof. In other examples, the thermoplastic material is selected from the group consisting of polyethylene, polypropylene, including low-density, but particularly high-density polyethylene and polypropylene. Polyesters such as polyethylene terephthalate, polyethylene furanoate (PEF), thermoplastic elastomers from polyolefin blends, copolymers of polyethylene and mixtures thereof.

Further illustrated polyolefins include, but are not limited to, polymethylpentene and polybutene-1. Any of the aforementioned polyolefins could be sourced from bio-based feedstocks, such as sugarcane or other agricultural products, to produce a bio-polypropylene or bio-polyethylene. Polyolefins may demonstrate shear thinning when in a molten state. Shear thinning is a reduction in viscosity when the fluid is placed under compressive stress. Shear thinning can beneficially allow for the flow of the thermoplastic material to be maintained throughout the injection molding process. Without intending to be bound by theory, it is believed that the shear thinning properties of a thermoplastic material, and in particular polyolefins, results in less variation of the materials viscosity when the material is processed at constant pressures. As a result, one or more embodiments of the substantially constant injection pressure molding machines and methods of the present disclosure can be less sensitive to variations in the thermoplastic material, for example, resulting from colorants and other additives as well as processing conditions. This decreased sensitivity to batch-to-batch variations of the properties thermoplastic material (including MFI variations) can also advantageously allow post-industrial and post consumer recycled plastics to be processed using embodiments of the apparatuses and methods of the present disclosure. Post-industrial, post consumer recycled plastics are derived from end products that have completed their life cycle as a consumer item and would otherwise have been disposed of as a solid waste product. Such recycled plastic, and blends of thermoplastic materials, inherently have significant batch-to-batch variation of their material properties.

The plastic articles using one or more embodiments of the substantially constant injection pressure molding machines and methods of the present disclosure may be formed from a virgin resin, a reground or recycled resin, petroleum derived resins, bio-derived resins from plant materials, and combinations of such resins. The articles may comprise fillers and additives in addition to the base resin material. Exemplary fillers and additives include colorants, cross-linking polymers, inorganic and organic fillers such as calcium carbonate, opacifiers, and processing aids.

The base thermoplastic material can also be, for example, a polyester. Illustrative polyesters include, but are not limited to, polyethylene teraphthalate (PET). The PET polymer could be sourced from bio-based feedstocks, such as sugarcane or other agricultural products, to produce a partially or fully bio-PET polymer. Other suitable thermoplastic materials include copolymers of polypropylene and polyethylene, and polymers and copolymers of thermoplastic elastomers, polyester, polystyrene, polycarbonate, poly (acrylonitrile-butadiene-styrene), poly(lactic acid), bio-based polyesters such as poly(ethylene furanate) polyhydroxyalkanoate, poly(ethylene furanoate), (considered to be an alternative to, or drop-in replacement for, PET), polyhydroxyalkanoate, polyamides, polyacetals, ethylene-alpha olefin rubbers, and styrene-butadiene-styrene block copolymers. The thermoplastic material can also be a blend of multiple polymeric and non-polymeric materials. The thermoplastic material can be, for example, a blend of high, medium, and low molecular polymers yielding a multi-modal or bi-modal blend. The multi-modal material can be designed in a way that results in a thermoplastic material that has superior flow properties yet has satisfactory chemo/physical properties. The thermoplastic material can also be a blend of a polymer with one or more small molecule additives. The small molecule could be, for example, a siloxane or other lubricating molecule that, when added to the thermoplastic material, improves the flowability of the polymeric material.

Other additives may include inorganic fillers such calcium carbonate, calcium sulfate, talcs, clays (e.g., nanoclays), aluminum hydroxide, CaSiO3, glass formed into fibers or microspheres, crystalline silicas (e.g., quartz, novacite, crystallobite), magnesium hydroxide, mica, sodium sulfate, lithopone, magnesium carbonate, iron oxide; or, organic fillers such as rice husks, straw, hemp fiber, wood flour, or wood, bamboo or sugarcane fiber.

Other suitable thermoplastic materials include renewable polymers such as nonlimiting examples of polymers produced directly from organisms, such as polyhydroxyalkanoates (e.g., poly(beta-hydroxyalkanoate), poly(3-hydroxybutyrate-co-3-hydroxyvalerate, NODAX (Registered Trademark)), and bacterial cellulose; polymers extracted from plants, agricultural and forest, and biomass, such as polysaccharides and derivatives thereof (e.g., gums, cellulose, cellulose esters, chitin, chitosan, starch, chemically modified starch, particles of cellulose acetate), proteins (e.g., zein, whey, gluten, collagen), lipids, lignins, and natural rubber; thermoplastic starch produced from starch or chemically starch and current polymers derived from naturally sourced monomers and derivatives, such as bio-polyethylene, bio-polypropylene, polytrimethylene terephthalate, polylactic acid, NYLON 11, alkyd resins, succinic acid-based polyesters, and bio-polyethylene terephthalate.

The suitable thermoplastic materials may include a blend or blends of different thermoplastic materials such in the examples cited above. As well the different materials may be a combination of materials derived from virgin bio-derived or petroleum-derived materials, or recycled materials of bio-derived or petroleum-derived materials. One or more of the thermoplastic materials in a blend may be biodegradable. And for non-blend thermoplastic materials, the thermoplastic material may be biodegradable.

The molten thermoplastic materials described herein may have a viscosity, as defined by MFI, of about 0.1 g/10 min to about 500 g/10 min, as measured by ASTM D 1238 performed at temperature of about 230° C. with an about 2.16 kg weight. For example, for polypropylene the melt flow index can be in a range of about 0.5 g/10 min to about 200 g/10 min. Other suitable MFIs include about 1 g/10 min to about 400 g/10 min, about 10 g/10 min to about 300 g/10 min, about 20 to about 200 g/10 min, about 30 g/10 min to about 100 g/10 min, about 50 g/10 min to about 75 g/10 min, about 0.1 g/10 min to about 1 g/10 min, or about 1 g/10 min to about 25 g/10 min. The MFI of the material may be selected based on any one or more of cost, availability, the application and use of the molded article. For examples, thermoplastic materials with an MFI of about 0.1 g/10 min to about 5 g/10 min may be suitable for use as articles for ISBM applications. Thermoplastic materials with an MFI of about 5 g/10 min to about 50 g/10 min may be suitable for use as caps and closures for packaging articles. Thermoplastic materials with an MFI of 50 g/10 min to about 150 g/10 min may be suitable for use in the manufacture of buckets or tubs. Thermoplastic materials with an MFI of 150 g/10 min to about 500 g/10 min may be suitable for molded articles that have extremely high L/T ratios such as a thin plate. Manufacturers of such thermoplastic materials generally teach that the materials should be injection molded using melt pressures in excess of 6,000 psi, and often in great excess of 6,000 psi. Contrary to conventional teachings regarding injection molding of such thermoplastic materials, embodiments of the substantially constant low injection pressure molding method and device of the disclosure advantageously allow for forming quality injection molded parts using such thermoplastic materials and processing at melt pressures below 6,000 psi, and possibly well below 6,000 psi and also facilitate use of thermoplastic materials having MFIs outside the conventional ranges, based on parameters such as cost and availability, as will be described in greater detail below.

Exemplary thermoplastic resins together with their recommended operating pressure ranges are provided in the following table (all numerical values provided in the following Table 2 may be preceded with the term "about"):

lower melt flow rates can result in lower manufacturing output and can make large-scale commercial production prohibitive. To increase melt flow (or lower viscosity), the extruder temperature and/or pressure can be increased, but this often leads to uneven shear stress, inconsistent melt flow, bubble instability, sticking or slippage of materials, and/or non-uniform material strain throughout the extruder, resulting in poor quality extrudate having irregularities, deformations, and distortions that can even cause the extrudate to break upon exiting. Further, high temperatures can potentially burn the thermoplastic melt, and excessive pressures can breach the extruder's structural integrity, causing it to rupture, leak, or crack. Some or all of these problems can be problematic for the injection stage of the process. Alternatively, viscosity modifying additives such as diluents can be included in the formulation to help increase melt flow, reduce viscosity, and/or even out the shear stress.

TABLE 2

| Material | Full Name | Injection Pressure Range (PSI) | Company | Material Brand Name |
| --- | --- | --- | --- | --- |
| Pp | Polypropylene | 10000-15000 | RTP Imagineering Plastics | RTP 100 series Polypropylene |
| Nylon | | 10000-18000 | RTP Imagineering Plastics | RTP 200 series Nylon |
| ABS | Acrylonitrile Butadiene Styrene | 8000-20000 | Marplex | Astalac ABS |
| PET | Polyester | 5800-14500 | Asia International | AIE PET 401F |
| Acetal Copolymer | | 7000-17000 | API Kolon | Kocetal |
| PC | Polycarbonate | 10000-15000 | RTP Imagineering Plastics | RTP 300 series Polycarbonate |
| PS | Polystyrene | 10000-15000 | RTP Imagineering Plastics | RTP 400 series |
| SAN | Styrene Acrylonitrile | 10000-15000 | RTP Imagineering Plastics | RTP 500 series |
| PE | LDPE & HDPE | 10000-15000 | RTP Imagineering Plastics | RTP 700 Series |
| TPE | Thermoplastic Elastomer | 10000-15000 | RTP Imagineering Plastics | RTP 1500 series |
| PVDF | Polyvinylidene Fluoride | 10000-15000 | RTP Imagineering Plastics | RTP 3300 series |
| PTI | Polytrimethylene Terephthalate | 10000-15000 | RTP Imagineering Plastics | RTP 4700 series |
| PBT | Polybutylene Terephthalate | 10000-15000 | RTP Imagineering Plastics | RTP 1000 series |
| PLA | Polylactic Acid | 8000-15000 | RTP Imagineering Plastics | RTP 2099 series |

While more than one of the embodiments involves filling substantially the entire mold cavity with the shot comprising the molten thermoplastic material while maintaining the melt pressure of the shot comprising the molten thermoplastic material at a substantially constant pressure, specific thermoplastic materials benefit from the disclosure at different constant pressures. Specifically: PP, nylon, PC, PS, SAN, PE, TPE, PVDF, PTI, PBT, and PLA at a substantially constant pressure of less than about 10,000 psi; ABS at a substantially constant pressure of less than about 8,000 psi; PET at a substantially constant pressure of less than 5,800 psi; Acetal copolymer at a substantially constant pressure of less than about 7,000 psi; plus poly(ethylene furanate) polyhydroxyalkanoate, polyethylene furanoate (aka PEF) at substantially constant pressure of less than about 10,000 psi, or about 8,000 psi, or about 7,000 psi or about 6,000 psi, or about 5,800 psi.

Thermoplastic polymers generally have higher molecular weights, which correspond to higher viscosities and lower melt flow rates at a given temperature. In some cases, these Many of these additives tend to migrate to the polymer's surface, resulting in a bloom that can render the thermoplastic unacceptable for its intended use. For example, diluent migration can make the thermoplastic article look or feel greasy, contaminate other materials it contacts, interfere with adhesion, and/or make further processing such as heat sealing or surface printing problematic. The effect may depend upon the type and percent included in the composition. A non-migrating additive can also be used, such as HCO.

Additives may be included in the thermoplastic materials. For example, blend additives, including viscosity modifiers may be included such as PP wax and hydrogenated castor oil. For example, the thermoplastic material can include a mixture, blend or an intimate admixture of a wax having a melting point greater than about 25° C., comprising about 0.1% to 50 wt % wax or about 5 wt % to about 40 wt % of the wax, based upon the total weight of the composition or about 8 wt % to about 30 wt % of the wax, based upon the total weight of the composition or about 10 wt % to about 20 wt % of the wax, based upon the total weight of the composition.

The wax may comprise a lipid, examples of which are a monoglyceride, diglyceride, triglyceride, fatty acid, fatty alcohol, esterified fatty acid, epoxidized lipid, maleated lipid, hydrogenated lipid, alkyd resin derived from a lipid, sucrose polyester, or combinations thereof. In other embodiments, the wax may comprise a mineral wax examples of which are a linear alkane, a branched alkane, or combinations thereof. The wax may comprise a wax which is selected from the group consisting of hydrogenated soy bean oil, partially hydrogenated soy bean oil, epoxidized soy bean oil, maleated soy bean oil, tristearin, tripalmitin, 1,2-dipalmitoolein, 1,3-dipalmitoolein, 1-palmito-3-stearo-2-olein, 1-palmito-2-stearo-3-olein, 2-palmito-1-stearo-3-olein, 1,2-dipalmitolinolein, 1,2-distearo-olein, 1,3-distearo-olein, trimyristin, trilaurin, capric acid, caproic acid, caprylic acid, lauric acid, myristic acid, palmitic acid, stearic acid, and combinations thereof. The wax may comprise a wax is selected from the group consisting of a hydrogenated plant oil, a partially hydrogenated plant oil, an epoxidized plant oil, a maleated plant oil, and combinations thereof, wherein the plant oil may soy bean oil, corn oil, canola oil, palm kernel oil, or a combination thereof.

In other embodiments, oils or waxes may be selected from the group consisting of soy bean oil, epoxidized soy bean oil, maleated soy bean oil, corn oil, cottonseed oil, canola oil, beef tallow, castor oil, coconut oil, coconut seed oil, corn germ oil, fish oil, linseed oil, olive oil, oiticica oil, palm kernel oil, palm oil, palm seed oil, peanut oil, rapeseed oil, safflower oil, sperm oil, sunflower seed oil, tall oil, tung oil, whale oil, tristearin, triolein, tripalmitin, 1,2-dipalmitoolein, 1,3-dipalmitoolein, 1-palmito-3-stearo-2-olein, 1-palmito-2-stearo-3-olein, 2-palmito-1-stearo-3-olein, trilinolein, 1,2-dipalmitolinolein, 1-palmito-dilinolein, 1-stearo-dilinolein, 1,2-diacetopalmitin, 1,2-distearo-olein, 1,3-distearo-olein, trimyristin, trilaurin, capric acid, caproic acid, caprylic acid, lauric acid, lauroleic acid, linoleic acid, linolenic acid, myristic acid, myristoleic acid, oleic acid, palmitic acid, palmitoleic acid, stearic acid, and combinations thereof.

The wax or oil may be dispersed within the thermoplastic polymer such that the wax or oil has a droplet size of less than about 10 μm within the thermoplastic polymer or wherein the droplet size is less than about 5 μm or wherein the droplet size is less than about 1 μm, or wherein the droplet size is less than about 500 nm.

The composition may further comprise an additive, wherein the additive is wax or oil soluble or wax or oil dispersible. The additive may be a perfume, dye, pigment, surfactant, nanoparticle, antistatic agent, filler, nucleating agent, or combination thereof. These additives may be included even if a wax or oil is not incorporated into the composition. The wax or oil may be a renewable or sustainable material.

For example, the resin composition can include a mixture, blend or an intimate admixture of a thermoplastic starch having a melting point greater than about 25° C., comprising about 0.1% to about 90 wt % TPS or wax or about 10 wt % to about 80 wt % of the thermoplastic starch, based upon the total weight of the composition or about 20 wt % to about 40 wt %. The thermoplastic starch may comprise starch or a starch derivative and a plasticizer. In another embodiment, the plasticizer may comprise a polyol wherein the polyol is selected from the group consisting of mannitol, sorbitol, glycerin, and combinations thereof. The plasticizer may be selected from the group consisting of glycerol, ethylene glycol, propylene glycol, ethylene diglycol, propylene diglycol, ethylene triglycol, propylene triglycol, polyethylene glycol, polypropylene glycol, 1,2-propanediol, 1,3-propanediol, 1,2-butanediol, 1,3-butanediol, 1,4-butanediol, 1,5-pentanediol, 1,6-hexanediol, 1,5-hexanediol, 1,2,6-hexanetriol, 1,3,5-hexanetriol, neopentyl glycol, trimethylolpropane, pentaerythritol, sorbitol, glycerol ethoxylate, tridecyl adipate, isodecyl benzoate, tributyl citrate, tributyl phosphate, dimethyl sebacate, urea, pentaerythritol ethoxylate, sorbitol acetate, pentaerythritol acetate, ethylenebisformamide, sorbitol diacetate, sorbitol monoethoxylate, sorbitol diethoxylate, sorbitol hexaethoxylate, sorbitol dipropoxylate, aminosorbitol, trihydroxymethylaminomethane, glucose/PEG, a reaction product of ethylene oxide with glucose, trimethylolpropane monoethoxylate, mannitol monoacetate, mannitol monoethoxylate, butyl glucoside, glucose monoethoxylate, α-methyl glucoside, carboxymethylsorbitol sodium salt, sodium lactate, polyglycerol monoethoxylate, erythriol, arabitol, adonitol, xylitol, mannitol, iditol, galactitol, allitol, malitol, formaide, N-methylformamide, dimethyl sulfoxide, an alkylamide, a polyglycerol having 2 to 10 repeating units, and combinations thereof.

The starch or starch derivative may be selected from the group consisting of starch, hydroxyethyl starch, hydroxypropyl starch, carboxymethylated starch, starch phosphate, starch acetate, a cationic starch, (2-hydroxy-3-trimethyl(ammoniumpropyl) starch chloride, a starch modified by acid, base, or enzyme hydrolysis, a starch modified by oxidation, and combinations thereof.

Hydrogenated castor oil (also called castor wax) is a triacylglycerol prepared from castor oil, a product of the castor bean, through controlled hydrogenation. HCO is characterized by poor insolubility in most materials, very narrow melting range, lubricity, and excellent pigment and dye dispersibility. Because it is plant-based, HCO is a 100% bio-based and recyclable material. A suitable commercially available grade of HCO is "HYDROGENATED CASTOR OIL" available from Alnoroil Company, Inc. (Valley Stream, N.Y.). The principle constituent of HCO is 12-hydroxystearin. HCO is unique among fatty materials, as it primarily consists of 18-carbon fatty acid chains that each have a secondary hydroxyl group. While other waxes are prone to migrating to the thermoplastic's surface, HCO is unique because it does not. While not wishing to be limited by theory, it is believed that HCO is non-migrating because each molecule contains multiple (typically 3) hydroxyl (—OH) groups, enabling strong intermolecular hydrogen bonding between HCO molecules. A hydrogen bond is a directional electrostatic attraction involving a hydrogen atom and an electronegative atom such as an oxygen, nitrogen, or fluorine. In an —OH group, the oxygen attracts the bonding electrons more than the attached hydrogen does creating a dipole with the oxygen having a partial negative charge and the hydrogen a partial positive charge. Two —OH groups can thus be Coulombically attracted to one another, with the positive end of one interacting with the negative end of the other. In the case of HCO, a hydrogen of the —OH group of any particular fatty acid chain can interact with another —OH group on a different molecule to form an intermolecular hydrogen bond. Because HCO has multiple hydroxyl groups, multiple intermolecular associations are possible creating an entangled "supramolecular" structure with higher cohesive forces than other lower molecular weight lipids. While stronger than other non-covalent bonding, this form of intermolecular association can still be readily broken, thus preserving the thermoplastic nature of the composition. The composition can comprise, based upon the total weight of the composition, from about 5 wt % to about 50 wt % HCO, or from about 10 to about 50%, or from about 15 to about 50%, or from about 20 to about 50%, or from about 30 to about 50% HCO. The HCO contemplated for use herein has a melting point greater than about 65° C.

The HCO can be dispersed within the thermoplastic polymer such that the HCO has a droplet size of less than about 10 µm, less than about 5 µm, less than about 1 µm, or less than about 500 nm within the thermoplastic polymer. As used herein, the HCO and the polymer form an "intimate admixture" when the HCO has a droplet size less than about 10 µm within the thermoplastic polymer.

If one desires to determine the percentage of HCO present in an unknown polymer-HCO composition (e.g., in a product made by a third party), the amount of HCO can be determined via a gravimetric weight loss method. The solidified mixture is broken apart to produce a mixture of particles with the narrowest dimension no greater than 1 mm (i.e. the smallest dimension can be no larger than 1 mm), the mixture is weighed, and then placed into acetone at a ratio of 1 g of mixture per 100 g of acetone using a refluxing flask system. The acetone and pulverized mixture is heated at 60° C. for 20 hours. The solid sample is removed and air dried for 60 minutes and a final weight determined. The equation for calculating the weight percent HCO is:

$$\text{weight \% } HCO = \frac{[\text{initial weight of mixture} - \text{final weight of mixture}]}{[\text{initial weight of mixture}]} \times 100\%$$

Other waxes or oils can optionally be included such as hydrogenated soy bean oil, partially hydrogenated soy bean oil, partially hydrogenated palm kernel oil, and combinations thereof. Inedible waxes from Jatropha and rapeseed oil can also be used. Furthermore, optional waxes can be selected from the group consisting of a hydrogenated plant oil, a partially hydrogenated plant oil, an epoxidized plant oil, a maleated plant oil, and combinations thereof. Specific examples of such plant oils include soy bean oil, corn oil, canola oil, and palm kernel oil.

Current injection molding processes use conventional injection molding process conditions and equipment. Such conventional conditions and equipment expose the resin to degradation conditions such as high shear or pressures, sometimes of a changing nature, and heat degradation due to high temperatures of processing the resin. Extended time exposure of higher temperature heat may affect the article, subjecting the finished portion (e.g., fitments, threads, snap-on bosses and detents, etc.) to possible degradation. For example, the article may experience conduction of heat by the resin itself from another portion of the part.

Selection of Thermoplastic Materials

As indicated above, while MFI may be a somewhat undesirable tool for gauging processability of thermoplastic materials, it can be a good gauge of average molecular weight of a thermoplastic material and is commonly used to identify thermoplastic materials suitable for a particular injection molding process. For example, in conventional injection molding processes, an article may be identified and a suitable thermoplastic material may be selected based on performance properties desired for that part, such as impact strength and chemical resistance, as examples. Knowing the desired properties and the injection molding apparatus, a thermoplastic material may be selected based type of material and its MFI, which is typically supplied by a data sheet for that thermoplastic material. Once the article is produced, testing may be performed to determine whether the product meets engineering specifications. By meeting "engineering specification," it is meant that the molded article substantially meets the listed targets and tolerances of the specification. Without limitation, specifications may include measured linear dimensions, mass weights, displaced volumes, areas of surfaces, elastic moduli, bending moduli, flexural moduli, yield strengths in shear, yield strengths in tension, ultimate strengths, deflection in bending, deflection in tension, deflection in shear, compressibility, density, porosity, presence of weld lines, location of weld lines, as well as others. If the article fails to meet engineering specifications, the process may be restarted with a thermoplastic material having a different MFI or some other parameter, which can be time-consuming. If the article meets the engineering specification, the same or similar thermoplastic materials having the same or nearly the same MFI (e.g., +/−10 percent) may be selected. So, for example, if a thermoplastic material having an MFI of 10 generated the acceptable article, the operator may have an MFI window of between 9 and 11 to choose suitable thermoplastic materials from.

Because single-molecular-weight polymers are difficult or impossible to manufacture at large scale (>100 kg per batch), the MFI range for a material specified by a supply chain must have also a tolerance including upper and lower limits, in that an MFI specified as 13 may in fact be further specified as 13+/−10%, indicating the MFI supplied is between 11.7 and 14.3. It is understood by those familiar with the art that material purity, processing limits and variations, and other manufacturing criteria affect the MFI range of a material, and that a material with a more narrow range of MFI (for example, 5% variation about a mean value) should be more difficult or less efficient to manufacture when compared to the same material manufactured with a wider range of MFI (for example 10% or 20%). It is further understood by those familiar in the art that the difficulty in manufacturing or supplying a material with a given MFI range may increase disproportionately as the MFI range is decreased below certain thresholds. Thus choices of thermoplastic materials within an MFI window may be limited by the supply chain's MFI range, wherein the MFI range must be completely or substantially maintained within the MFI window, and there may be cost and availability issues. Due to embodiments of the substantially constant low injection pressure molding method and apparatus described herein, use of thermoplastic materials having MFIs with some portion of the range outside the conventional MFI window can be used which can allow for selection of a wider variety of thermoplastic materials.

Figure 8:
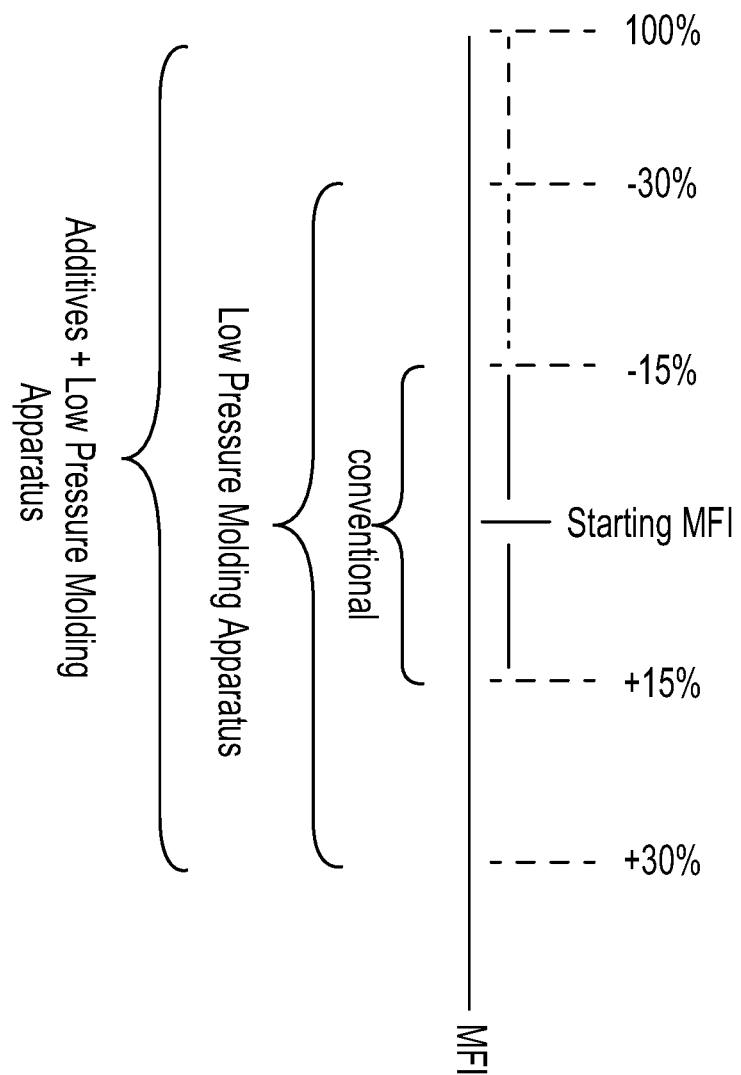
FIG. 8 illustrates how the methods and apparatuses described herein can widen the MFI window for thermoplastic materials compared to conventional processes.

FIG. 8 illustrates how the methods and apparatuses described herein can widen the MFI window for thermoplastic materials compared to conventional processes. Widening the MFI window can increase the material variety in the supply chain from which one can choose, which can provide economic advantages. For illustrative purposes, a starting MFI may be chosen based at least in part on article geometry and desired properties of the finished part. A conventional injection molding apparatus may be able to accommodate a +/−15% MFI range from the starting MFI. The methods and apparatuses described herein, however, can accommodate even wider MFI ranges (e.g., greater than +/−15% or more, such as +/−30% or more) for the reasons described above. Use of additives can be used to accommodate even wider MFI ranges. As can be appreciated, accommodating wider MFI ranges can allow for use of MFI materials having greater variations in MFI, which tend to be priced lower than thermoplastic materials having relatively tight MFI variation. It also allows for selection of materials based on other market factors, such as availability.

Figure 9:
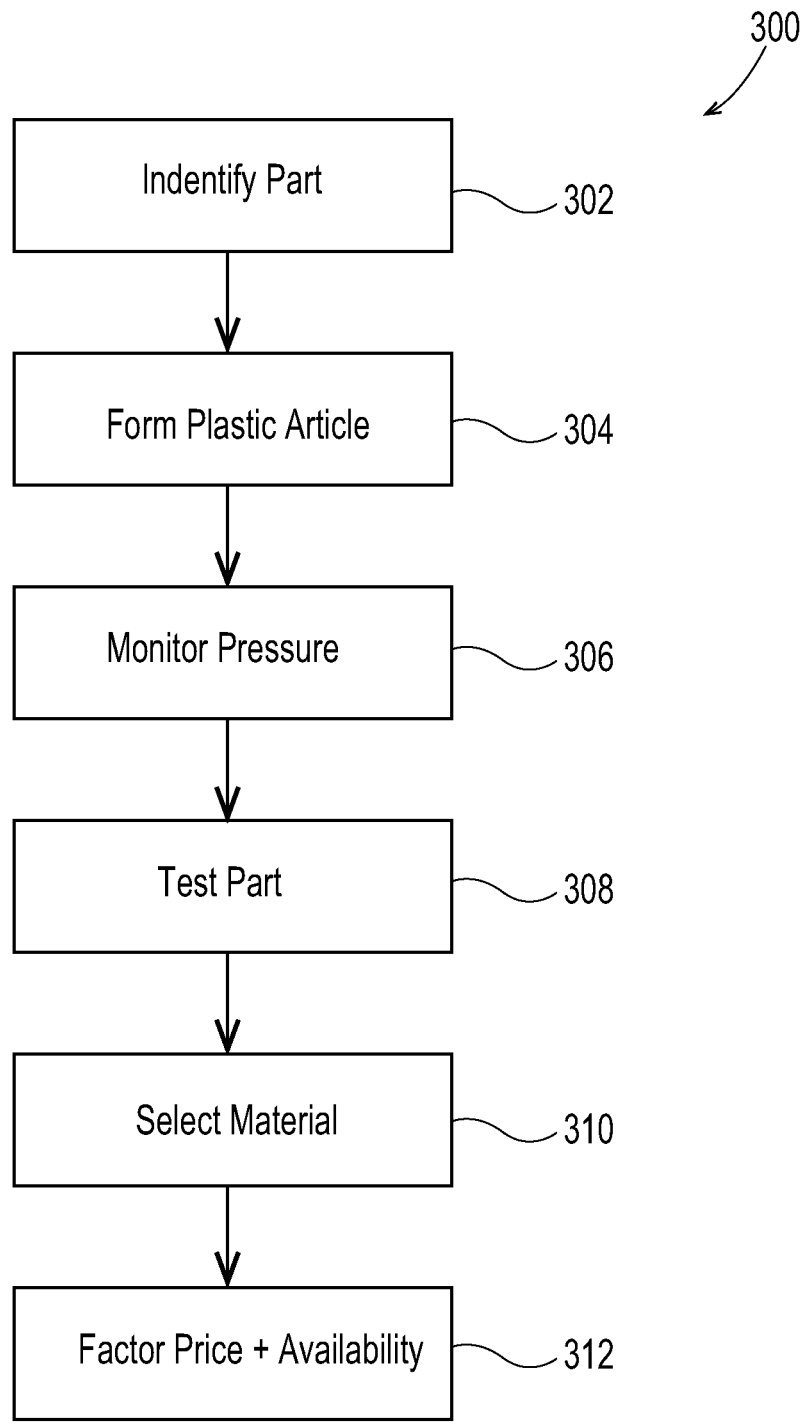
FIG. 9 illustrates a method of forming a plastic article from materials having a wide range of melt flow indices according to one or more embodiments described herein.

Referring to FIG. 9, a method 300 of forming a plastic article choosing from materials having a wide range of MFIs is provided. The thermoplastic materials may have MFIs of from about 0.1 to about 500, such as about 1 to about 400, about 10 to about 300, about 20 to about 200, about 30 to about 100, about 50 to about 75, about 0.1 to about 1, or about 1 to about 25, about 5 to about 35. At step 302, a part may be identified and a suitable thermoplastic material may be selected from a thermoplastic material supplier in a supply chain based on performance properties desired for that part, such as impact strength and chemical resistance, as examples. Knowing the desired properties, a thermoplastic material may be selected based on type of material and its MFI. In some embodiments, this selection process may be performed by a computer, for example, having part design inputs and supplier and materials information from, for example, the Internet or otherwise saved in memory. Unlike the convention processes, factors such as desired properties, cost and availability can play a more prominent role in selecting a suitable thermoplastic material than other factors, such as process limitations.

At step 304, the injection molding apparatus is used to form the plastic article, as described above. At step 306, the injection molding apparatus 10 uses the system controller 50 and the sensor 52 to continually monitor pressure of the molten thermoplastic material in the vicinity of the nozzle 26 (FIG. 1). As indicated above, the melt pressure is also indicative of the melt viscosity. If the controller determines that the pressure is too high or too low based on the signal from the sensor 52, the controller 50 may allow for viscosity modifying additives to be added to the thermoplastic material, which can also modify MFI of the thermoplastic material down or up. Once the part is produced, testing may be performed to determine whether the product meets engineering specifications at step 308. If the article fails to meet engineering specifications, the process may be restarted with a thermoplastic material having a different MFI or some other parameter, which can be time-consuming. However, compared to conventional processes, such an out-of-spec condition may occur less frequently during initial testing. It is also possible that a different melt pressure set point or range may need to be identified for a particular thermoplastic material. If the article meets engineering specifications, the same or different thermoplastic materials may be selected at step 310. For example, the same thermoplastic material may be used and may be selected from batches having different degrees of MFI variability. So, for example, if a thermoplastic material having an MFI of 10 generated the acceptable article, the operator may have an MFI window of between 5 and 35 to choose suitable thermoplastic materials from. Due to embodiments of the substantially constant low injection pressure molding method and apparatus, use of thermoplastic materials having MFIs outside the conventional MFI window may be used, which can allow for a greater selection based on market factors, such as price and availability at step 312.

Illustrative Example 1

Assuming a given part to be injection molded has a target MFI 20 for a polypropylene thermoplastic material, but based on pricing and availability an "off-spec" starting MFI 10 polypropylene thermoplastic material is purchased. However, by blending an appropriate amount of a polypropylene wax additive with MFI of 110 the "off-spec" MFI 10 polypropylene can be adjusted to a modified MFI of 20 appropriate for the part. Importantly, because this adjustment is done in real time based on sensor readings, the level of polypropylene wax additive can be adjusted on a shot-by-shot basis (or whatever running average adjustment desired) to insure that even as the starting MFI varies, the adjusted MFI always remains on target.

Illustrative Example 2

Assuming a target MFI of 20, a polypropylene thermoplastic material with starting MFI of 20+/−15% is purchased based on availability. Thus, a starting MFI of somewhere between 17 and 23 can be expected. By using the real time monitoring, additives such as MFI 110 polypropylene wax can be added determined levels to increase the MFI when it is too low. In such a manner, the effective MFI variability is reduced, significantly reducing the amount of operator intervention required and/or decreasing the part quality variability. As an illustrative example, 10% of an MFI 110 additive can increase an MFI of 10 up to an MFI of 20. Similarly, 15% additive can extend the range from to 5-23.

Illustrative Example 3

Assuming a target MFI of 20, a polypropylene thermoplastic material with a starting MFI 15 is purchased, and 5% of 110 MFI hydrogenated castor oil additive by weight is added. This 95:5 mixture of MFI 15:110 results in a modified MFI of approximately 20. Assuming a 15% variation on the polypropylene starting MFI, this mixture will give an MFI range of about 18-22.5. As the base polypropylene starting MFI varies, an MFI that is too low can be adjusted by increasing the HCO additive beyond 5%. The MFI range that can be accommodated by this approach is slightly larger than Illustrative Example 2 because the high end of the MFI range can also be expanded by decreasing the HCO additive below the initial 5%.

It is noted that the terms "substantially," "about," and "approximately," unless otherwise specified, may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Unless otherwise defined herein, the terms "substantially," "about," and "approximately" mean the quantitative comparison, value, measurement, or other representation may fall within 20% of the stated reference.

It should now be apparent that the various embodiments of the products illustrated and described herein may be produced by a low, substantially constant pressure molding process. While particular reference has been made herein to products for containing consumer goods or consumer goods products themselves, it should be apparent that the molding method discussed herein may be suitable for use in conjunction with products for use in the consumer goods industry, the food service industry, the transportation industry, the medical industry, the toy industry, and the like. Moreover, one skilled in the art will recognize the teachings disclosed herein may be used in the construction of stack molds, multiple material molds including rotational and core back molds, in combination with in-mold decoration, insert molding, in mold assembly, and the like.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of molding a plastic article with an injection molding apparatus that adjusts viscosity of a thermoplastic material based on an interpreted viscosity, the method comprising:
   (i) determining a target MFI and a target MFI window for molding the plastic article based on performance properties;
   (ii) providing a thermoplastic material for molding the plastic article, the thermoplastic material having a starting MFI that is outside the target MFI-window and has a greater than +/−15% MFI range from the starting MFI;
   (iii) loading the thermoplastic material into a plastic melt injection system of the injection molding apparatus for a multiple shot molding cycle with the thermoplastic material in a molten state;
   (iv) heating the thermoplastic material in the plastic melt injection system to the molten state;
   (v) forcing the molten thermoplastic material towards a nozzle to form a first shot of the multiple shot molding cycle;
   (vi) injecting the first shot of into a mold cavity through the nozzle;
   (vii) monitoring melt pressure of the first shot of during injection using a sensor located near an end of flow position in the mold cavity, and providing a signal to a controller indicative of melt pressure;
   (viii) adjusting in real time based on the signal to the control a viscosity of a second shot of the multiple shot molding cycle by loading, during the injection step, after injection is initiated and before the mold cavity is filled by the molten thermoplastic material, an additive into the plastic melt injection system and mixing the additive with the molten thermoplastic material to form a modified molten thermoplastic material, wherein the controller controls an amount of the additive loaded into the plastic melt injection system based on the signal and such that an MFI of the modified thermoplastic material during molding is controlled to be in the target MFI window;
   (ix) forcing the modified molten thermoplastic material towards the nozzle to form the second shot;
   (x) injecting the second shot into the mold cavity through the nozzle; and
   (xi) forming the molded plastic article by reducing a mold temperature of the thermoplastic material and the modified thermoplastic material within the mold cavity.

2. The method of claim 1 further comprising determining whether the molded article meets engineering specifications.

3. The method of claim 1, wherein the starting MFI of the thermoplastic material is at least half of the target MFI.

4. The method of claim 1, further comprising controlling with the controller an injection element based on the signal to change the melt pressure of the molten thermoplastic material filing the mold cavity.

5. The method of claim 1, wherein the MFI range from the starting MFI is greater than +/−15% to +/−30%.

6. A method of injection molding a plastic article using an injection molding apparatus for multiple shot molding cycles, comprising:
   (i) determining a target MFI and target MFI window for molding the plastic article;
   (ii) heating a thermoplastic material in a plastic melt injection system of the injection molding apparatus to a molten state, wherein the thermoplastic material has a starting MFI that is greater than +/−15% of target MFI and outside the target MFI window and/or has a greater than +/−15% MFI range from the starting MFI;
   (iii) forcing the molten thermoplastic material towards a nozzle to form a first shot;
   (iv) injecting the first shot into a mold cavity;
   (v) monitoring melt pressure of the first shot during injection using a sensor located near an end of flow position in the mold cavity, and providing a signal to a controller indicative of melt pressure;
   (vi) adjusting in real time the viscosity of a second shot being prepared with the molten thermoplastic material in the plastic melt injection system during the injection step, after injection is initiated and before the mold cavity is filled by the molten thermoplastic material, by adding an additive to the plastic melt injection system and mixing the additive with the molten thermoplastic material to form a modified molten thermoplastic material, wherein an amount of additive added to the plastic melt injection system is controlled by the controller based on the signal to achieve a target melt pressure and such that an MFI of the modified thermoplastic material during molding is controlled to be in the target MFI window;
   (vii) forcing the modified molten thermoplastic material towards the nozzle to form the second shot;
   (viii) injecting the second shot into the mold cavity through the nozzle; and
   (ix) cooling the mold cavity once filled to form a molded article.

7. The method of claim 6, further comprising in step (ii) mixing a starting additive into the thermoplastic material while heating the thermoplastic material to the molten state.

8. The method of claim 6, wherein the starting MFI is greater than +/−15% of target MFI and outside the target MFI window.

9. The method of claim 6, wherein the starting MFI is at least half the target MFI.

10. The method of claim 6, wherein the MFI range from the starting MFI is greater than +/−15% to +/−30%.

* * * * *

UNITED STATES PATENT AND TRADEMARK OFFICE
CERTIFICATE OF CORRECTION

PATENT NO. : 11,010,816 B2
APPLICATION NO. : 15/247687
DATED : May 18, 2021
INVENTOR(S) : Gene Michael Altonen et al.

Page 1 of 1

It is certified that error appears in the above-identified patent and that said Letters Patent is hereby corrected as shown below:

In the Claims

At Column 33, Line 41, Claim 1 "MFI-window" should be -- MFI window --.

At Column 34, Line 20, Claim 20 "filing" should be -- filling --.

At Column 35, Line 2, Claim 27 "half the" should be -- half of the --.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*